(12) United States Patent
Liu

(10) Patent No.: US 10,605,250 B2
(45) Date of Patent: Mar. 31, 2020

(54) FAN AND METHOD AND DEVICE FOR CONTROLLING THE FAN

(71) Applicants: BEIJING XIAOMI MOBILE SOFTWARE CO., LTD., Beijing (CN); BEIJING SMARTMI TECHNOLOGY CO., LTD., Beijing (CN)

(72) Inventor: Dongxu Liu, Beijing (CN)

(73) Assignees: BEIJING XIAOMI MOBILE SOFTWARE CO., LTD., Beijing (CN); BEIJING SMARTMI TECHNOLOGY CO., LTD., Beijing (CN)

( * ) Notice: Subject to any disclaimer, the term of this patent is extended or adjusted under 35 U.S.C. 154(b) by 129 days.

(21) Appl. No.: 15/901,673

(22) Filed: Feb. 21, 2018

(65) Prior Publication Data
US 2018/0252226 A1    Sep. 6, 2018

(30) Foreign Application Priority Data

Mar. 1, 2017    (CN) .......................... 2017 1 0116985

(51) Int. Cl.
*F04D 27/00*    (2006.01)
*F04D 25/10*    (2006.01)
(Continued)

(52) U.S. Cl.
CPC .............. *F04D 27/00* (2013.01); *F04D 25/08* (2013.01); *F04D 25/105* (2013.01);
(Continued)

(58) Field of Classification Search
CPC ........ F04D 27/00; F04D 25/08; F04D 25/105; F04D 29/053; F04D 29/601; F24F 11/77;
(Continued)

(56) References Cited

U.S. PATENT DOCUMENTS 5,090,654 A    2/1992  Ridings et al.
6,283,709 B1 *  9/2001  Hill ....................... F04D 25/105
                                                            416/100
(Continued)

FOREIGN PATENT DOCUMENTS

CN    2632353 Y    8/2004
CN    105020156 A   11/2015
(Continued)

OTHER PUBLICATIONS

Extended European Search Report dated Jul. 16, 2018 in Patent Application No. 18158179.4, citing documents AO-AR therein, 8 pages.
Office Action dated Jan. 24, 2018, in corresponding Chinese Patent Application No. 201710116985.8

*Primary Examiner* — Thomas C Lee
*Assistant Examiner* — Michael Tang
(74) *Attorney, Agent, or Firm* — Oblon, McClelland, Maier & Neustadt, L.L.P.

(57) ABSTRACT

The present disclosure relates to a fan and a method and device for controlling the fan. The method includes controlling, via a support rod control device, a swinging motion of the swingable support rod, wherein the support rod control device is provided between the swingable support rod and the fan base; determining, when the swingable support rod is swinging, a current swing angle of the swingable support rod; determining a current distance between the fan and a user; determining, based on the current distance and the current swing angle, an axial rotation angle of the fan head; and rotating the fan head based on the axial rotation angle to direct air at the user.

20 Claims, 16 Drawing Sheets

(51) Int. Cl.
*F24F 11/79* (2018.01)
*F24F 11/77* (2018.01)
*F04D 29/053* (2006.01)
*F04D 25/08* (2006.01)
*F04D 29/60* (2006.01)
*F16C 11/04* (2006.01)
*G05B 19/042* (2006.01)
*F24F 120/12* (2018.01)

(52) U.S. Cl.
CPC ......... *F04D 29/053* (2013.01); *F04D 29/601* (2013.01); *F16C 11/04* (2013.01); *F24F 11/77* (2018.01); *F24F 11/79* (2018.01); *G05B 19/042* (2013.01); *F05D 2260/53* (2013.01); *F05D 2270/804* (2013.01); *F24F 2120/12* (2018.01); *G05B 2219/23133* (2013.01)

(58) Field of Classification Search
CPC ....... F24F 11/79; F24F 2120/12; F16C 11/04; G05B 19/042; G05B 2219/23133; F05D 2260/53; F05D 2270/804
See application file for complete search history.

(56) References Cited

U.S. PATENT DOCUMENTS

| | | | | |
|---|---|---|---|---|
| 9,016,645 | B2* | 4/2015 | Simpson | F16M 13/02 248/278.1 |
| 2006/0139484 | A1* | 6/2006 | Seo | H04N 5/232 348/373 |
| 2013/0057697 | A1* | 3/2013 | Pace | H04N 5/225 348/159 |
| 2015/0276402 | A1* | 10/2015 | Grasser | G01C 15/06 702/150 |
| 2016/0363341 | A1* | 12/2016 | Arens | F24F 7/007 |
| 2017/0064180 | A1* | 3/2017 | Kitagawa | G06K 9/00771 |

FOREIGN PATENT DOCUMENTS

| | | |
|---|---|---|
| CN | 105090082 A | 11/2015 |
| CN | 105257573 A | 1/2016 |
| CN | 105650019 A | 6/2016 |
| JP | 63-71597 | 3/1988 |
| JP | 63-71598 A | 3/1988 |
| JP | 6-25596 U | 4/1994 |
| JP | 2000-73988 A | 3/2000 |

* cited by examiner

FAN AND METHOD AND DEVICE FOR CONTROLLING THE FAN

CROSS-REFERENCE TO RELATED APPLICATION

The present application is based on and claims priority to Chinese Patent Application Serial No. 201710116985.8, filed on Mar. 1, 2017, the entire contents of which are incorporated herein by reference.

TECHNICAL FIELD

The present disclosure relates to the field of fan technology, and more particularly to a fan and a method and device for controlling the fan.

BACKGROUND

At present, a fan used in a user's daily life generally has a fan structure that enables a fan base and a support rod part to be fixed, and blows air for the user through back and forth motion of a fan head part. However, such fan structure and manner for air blowing result in a limited range of air blowing, affecting the user's comfort.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for controlling a fan that includes a swingable support rod provided between a fan base and a fan head. The method includes controlling, via a support rod control device, a swinging motion of the swingable support rod, wherein the support rod control device is provided between the swingable support rod and the fan base; determining, when the swingable support rod is swinging, a current swing angle of the swingable support rod; determining a current distance between the fan and a user; determining, based on the current distance and the current swing angle, an axial rotation angle of the fan head; and rotating the fan head based on the axial rotation angle to direct air at the user.

According to an aspect, the support rod control device includes a motor that is mounted on the fan base. In an example, the motor includes a first gear, and a bottom of the swingable support rod includes a second gear, the second gear being engaged with the first gear. The motor is configured to drive the second gear by rotating the first gear to swing the swingable support rod. In an example, a rotation direction of the motor is opposite to a swing direction of the swingable support rod, and a rotation direction of the axial rotation angle is opposite to the swing direction of the swingable support rod.

According to an aspect, when determining the current swing angle of the swingable support rod, the method includes determining a rotation angle of the motor; and associating the rotation angle of the motor with the current swing angle.

According to another aspect, when determining the axial rotation angle of the fan head, the method includes determining, based on the current swing angle and a length of the swingable support rod, a swing distance of the swingable support rod in a horizontal direction; and determining, based on the swing distance and the current distance, the axial rotation angle.

In an example the swingable support rod includes a set of sensors including at least one of an infrared ranging sensor, a position sensor, and an infrared image sensor. In an aspect, when determining the current distance between the fan and the user, the method determining a first location where the user is located currently based on the set of sensors; determining a second location where the fan head is located currently; and determining the current distance based on the first location and the second location.

In an example, the current distance includes a straight-line distance between the fan head and the user. In another example, the current distance includes a vertical-line distance between a longitudinal plane in which the swingable support rod is located and the user.

According to an aspect, when rotating the fan head, the method includes determining a rotated angle of the fan head; and rotating the fan head based on the axial rotation angle and the rotated angle to direct air at the user, wherein the rotated angle is an axial rotation angle of the fan head that is most recently determined.

Aspects of the disclosure also provide a device for controlling a fan that includes a swingable support rod provided between a fan base and a fan head, and a support rod control device provided between the swingable support rod and the fan base. The device includes a processor and a memory for storing instructions executable by the processor. The processor is configured to control, via the support rod control device, a swinging motion of the swingable support rod; determine, when the swingable support rod is swinging, a current swing angle of the swingable support rod; determine a current distance between the fan and a user; determine, based on the current distance and the current swing angle, an axial rotation angle of the fan head; and rotate the fan head based on the axial rotation angle to direct air at the user.

Aspects of the disclosure also provide a fan that includes a fan base; a fan head; a swingable support rod provided between the fan base and the fan head; a support rod control device provided between the swingable support rod and the fan base, and configured to control a swinging motion of the swingable support rod, and determine, when the swingable support rod is swinging, a current swing angle of the swingable support rod; a distance acquisition device that determines a current distance between the fan and a user; a calculation device that determines, based on the current distance and the current swing angle, an axial rotation angle of the fan head; and a head control device that rotates the fan head based on the axial rotation angle to direct air at the user.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

At present, a fan used in a user's daily life generally has a fan structure that enables a fan base and a support rod part to be fixed, and blows air for the user through left and right shaking of a fan head part. However, such fan structure and manner for air blowing result in a limited range of air blowing, affecting the user's comfortable experiences.

The aspects of the present disclosure provide a method for controlling a fan. The method is applicable in a fan control program, system or device, and the method may be performed by a fan or a control device associated with a fan (such as mobile phone, etc.).

Figure 1:
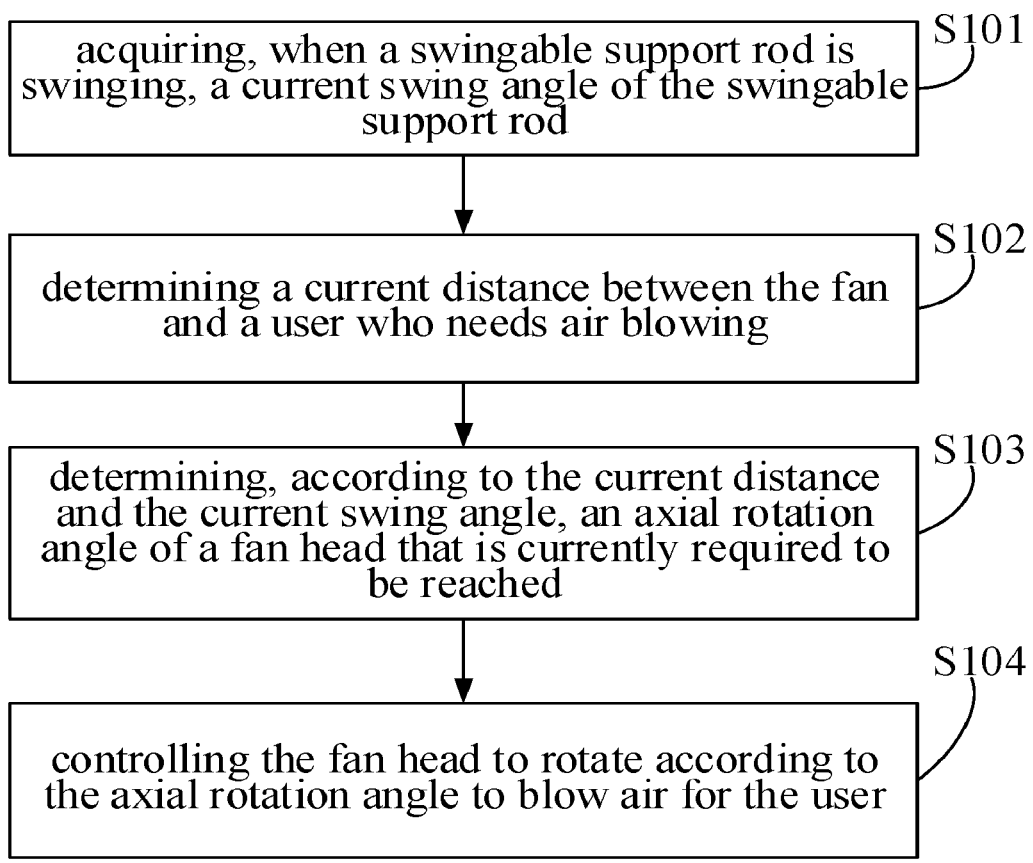
FIG. 1 is a flow diagram of a method for controlling a fan in accordance with an exemplary aspect of the present disclosure.

FIG. 1 is a flow diagram of a method for controlling a fan in accordance with an exemplary aspect.

As shown in FIG. 1, in the present disclosure, a fan has a swingable support rod provided between a fan base and a fan head, and a support rod control device provided between the swingable support rod and the fan base. The support rod control device controls swinging of the swingable support rod, and during swinging of the swingable support rod, the fan head connected with the swingable support rod swings following swinging of the swingable support rod.

By setting the swingable support rod between the fan base and the fan head, it is able to increase air blowing range by swinging of the support rod and thereby user's comfortable experiences can be improved.

The method includes steps S101 to S104.

In step S101, when the swingable support rod is swinging, a current swing angle of the swingable support rod is acquired.

The swingable support rod can swing left and right, and its specific swing amplitude depends on power provided by the support rod control device and user's settings.

Figure 12A:
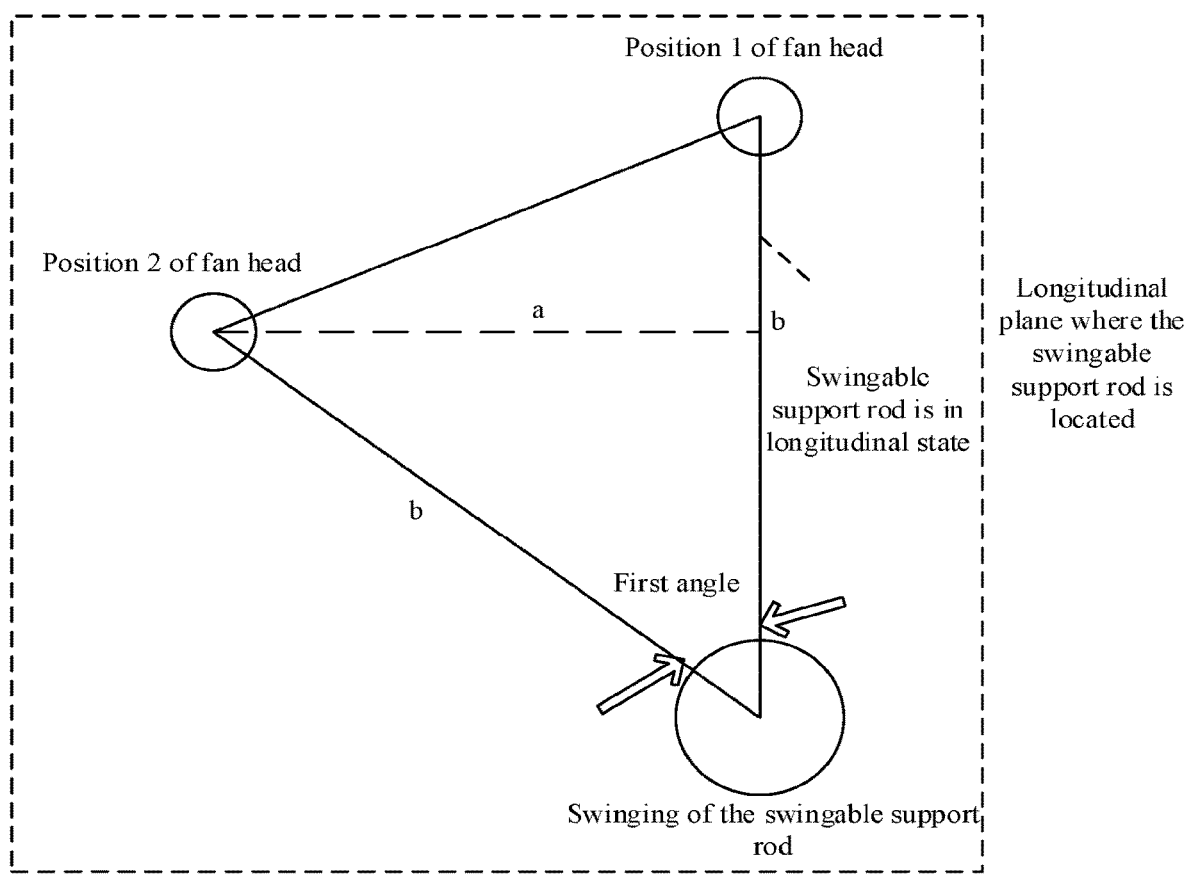
FIG. 12A is a diagram illustrating calculation of a swing distance of a swingable support rod in a horizontal direction with reference to a longitudinal plane in which the swingable support rod is located during swinging in accordance with an exemplary aspect of the present disclosure.

The current swing angle is an angle, when the swingable support rod swings from the most recently determined history swing position until current time, between a straight line where the current swing position of the swingable support rod is in and a longitudinal line where the swingable support rod is in when it is in a longitudinal state, shown as the first angle in FIG. 12A.

It should be noted that the aspects of the present disclosure considers a state in which the swingable support rod is in a longitudinal state as an initial state of the swingable support rod, and when the swingable support rod is in the initial state, the current swing angle is zero. Further, in the aspects of the present disclosure, it is assumed that when the swingable support rod is in its initial state (i.e., in a longitudinal state), the fan head is also in its initial state where the angle between its located plane and the horizontal direction is zero, that is, the fan head is facing right forward. Furthermore, when the swingable support rod is returned to the longitudinal state after swinging, it is considered that the swingable support rod moves back to its initial state again, and likewise, the fan head is again returned to its initial status.

In addition, in the aspects of the present disclosure, it is assumed that when the swingable support rod is in its first initial state, a user is located in front of the fan head and the fan head is capable of blowing air to the user.

Further, since the swinging of the swingable support rod and turning round of the fan head are all implemented by the fan itself, the present disclosure, when referring to left/right hereinafter, intends to indicate it is seen from the fan. It should be understood by those skilled in the art that the left/right seen from the fan is just opposite to that seen from the user.

Figure 12B:
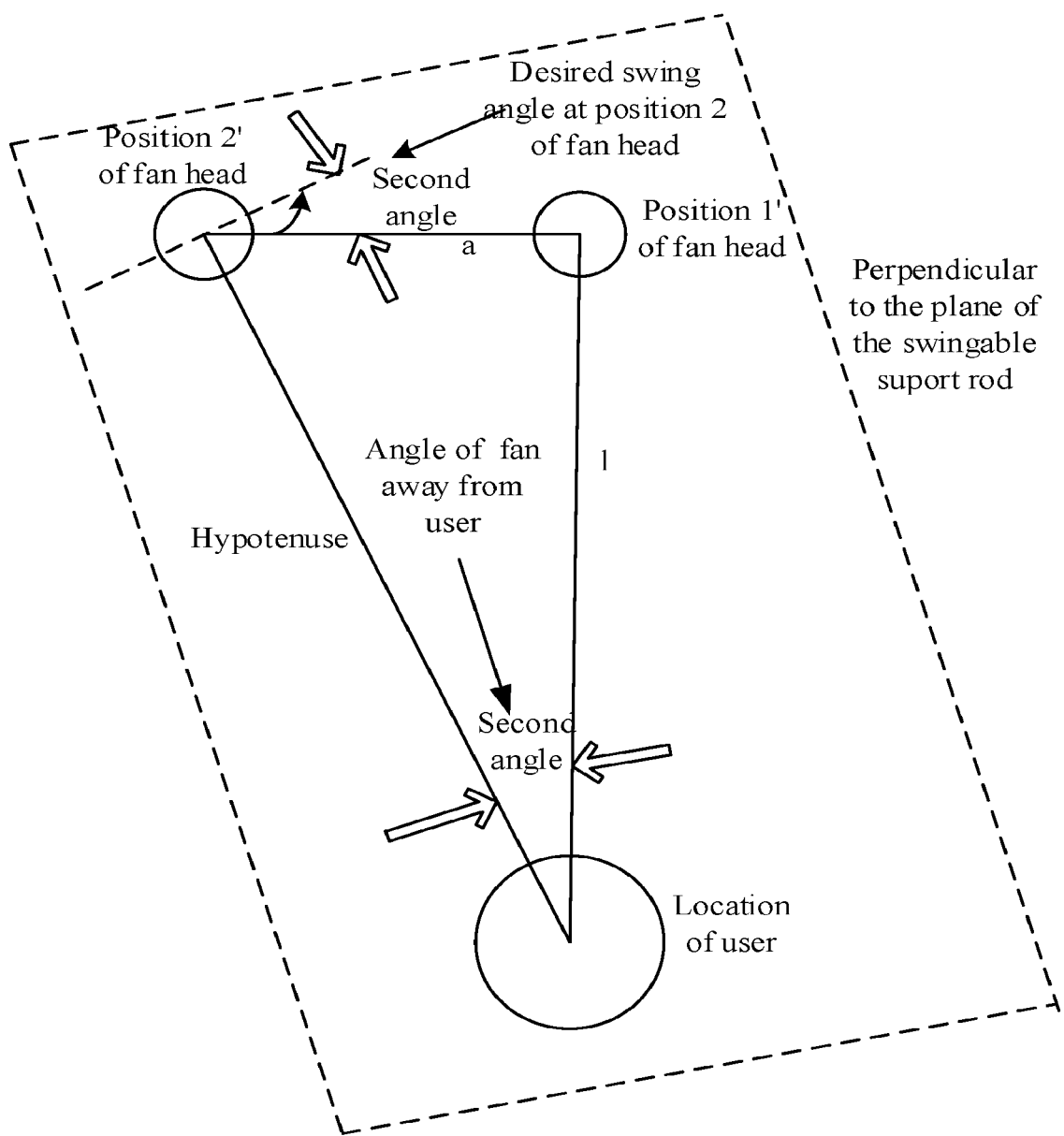
FIG. 12B is a diagram illustrating calculation of an axial rotation angle with reference to a horizontal plane perpendicular to the swingable support rod in accordance with an exemplary aspect of the present disclosure.

In addition, in aspects of the present disclosure, FIGS. 12A and 12B is used to illustrate, by an example where the swingable support rod swings from its initial state (the most recently determined history swing angle is zero) by the current swing angle rightward (seen from the fan, but the swing direction of the swingable support rod is leftward if seen from the user) to a certain position, calculation of a swing distance of the swingable support rod in the horizontal direction and an axial rotation angle that is required to be reached in order to assist understanding of those skilled in the art, does not indicate the swingable support rod always swings in this way. For example, the swingable support rod may swing from a history swing angle by a predetermined angle to reach a current swing angle, and in this situation, it should be understood by those skilled in the art that the current swing angle, the swing distance of the swingable support rod in the horizontal direction and the axial rotation angle that is required to be reached can still be calculated according to that shown in FIG. 12A and FIG. 12B.

In step S102, a current distance between the fan and a user who needs air blowing is determined.

The current distance can be obtained by various sensors such as an infrared ranging sensor, and the two end points of the current distance are the user and the fan head, such as the center point of the user and the fan head. The current distance may include a straight-line distance between the fan head and the user (the hypotenuse as shown in FIG. 12B), or, the current distance may include a vertical-line distance between a longitudinal plane in which the swingable support rod is located and the user (the Distance 1 as shown in FIG. 12B).

In step S103, according to the current distance and the current swing angle, an axial rotation angle of the fan head that is currently required to be reached is determined. The axial rotation angle that is currently required to be reached is an axial rotation angle required for blowing air for the user with the fan head facing the user (i.e., the user is located in right front of the fan head).

The axial rotation angle is determined with respect to the horizontal direction, and is an angle of the fan head after rotation with respect to a state where the swingable support rod reaches a desired axial rotation, that is, an angle between a plane where the fan head, after its rotation, is in and the horizontal direction required for attaining a desired swinging (as shown in FIGS. 12A and 12B, it is assumed that the swingable support rod swings from its initial state to the right (seen from the fan) so that the fan head reaches the position 2 from the position 1, and in this situation, in order to enable the fan to always blow air directly to the user, the fan head should rotate leftward by a second angle, which is an angle between a plane in which the fan head is in when at the position 2 and the horizontal direction required for attaining a desired swinging). In addition, the axial rotation angle can be attained by a motor that controls rotation of the fan head.

In step S104, the fan head is controlled to rotate according to the axial rotation angle to blow air for the user.

By acquiring, when the swingable support rod is swinging, the current swing angle of the swingable support rod, determining the current distance between the fan and a user who needs air blowing, determining, according to the current distance and the current swing angle, an axial rotation angle of the fan head that is currently required to be reached, it is able to not only increase air blowing range through swinging of the swingable support rod, but also ensure that the fan head always aims at the user to blow air during swinging of the swingable support rod as much as possible by controlling the fan head to make rotation axially, and thereby user's comfortable experiences can be improved.

The above-described steps S101 to S104 may be performed at predetermined time intervals, or the steps S101 to S104 may be performed in real time in order to enable the fan head to always aim at the user as much as possible during swinging of the swingable support rod.

In one aspect, the support rod control device may include: a motor having a first gear, wherein the motor is mounted on the fan base, and wherein the swingable support rod has a second gear on its bottom, the second gear being engaged with the first gear. The motor is operable to: drive, upon rotation, the second gear by the first gear to rotate so that the swingable support rod swings, wherein rotation direction of the motor is opposite to swing direction of the swingable support rod, and rotation direction of the axial rotation angle is opposite to the swing direction of the swingable support rod.

Figure 11A:
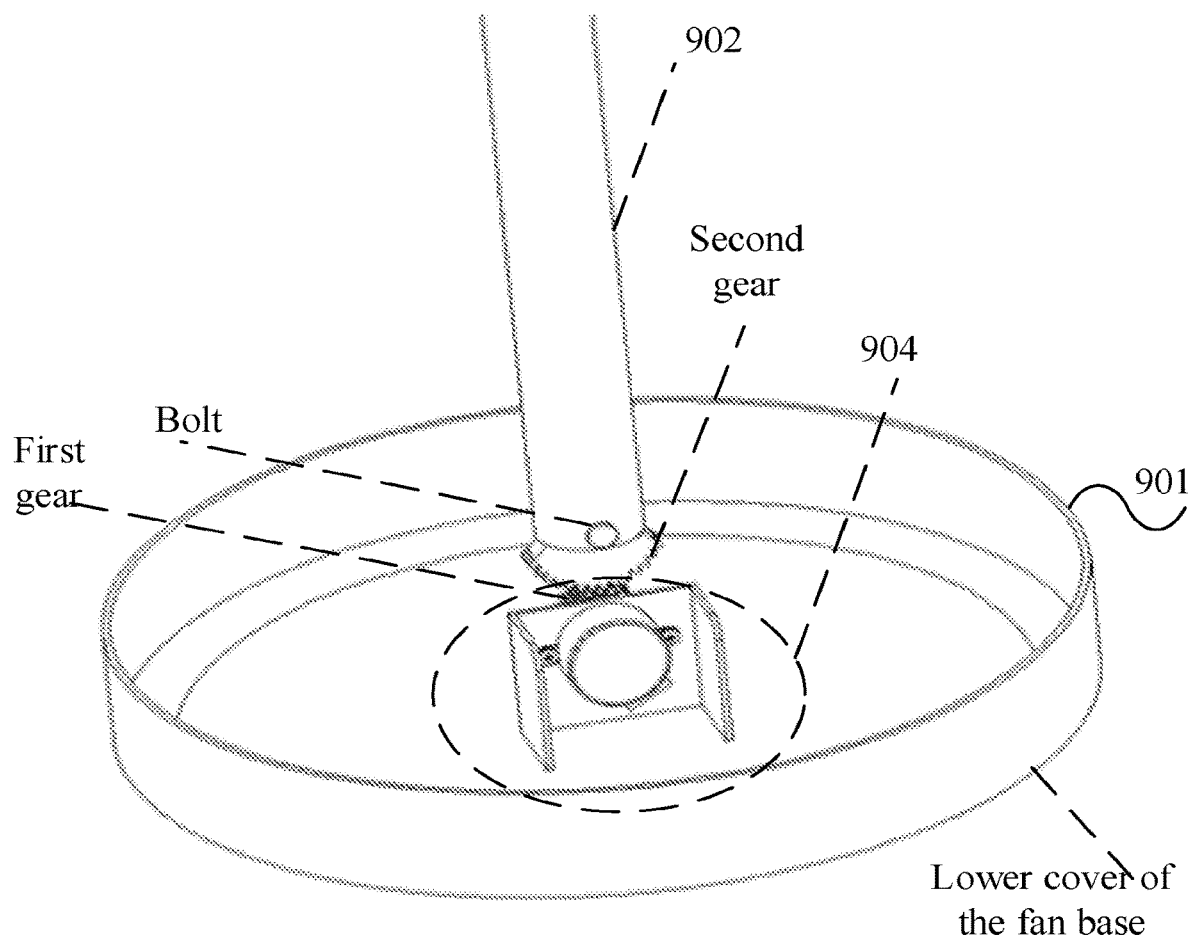
FIG. 11A is a schematic view of a three-dimensional structure of a fan with its fan base being not covered by an upper cover in accordance with an exemplary aspect of the present disclosure.
Figure 11B:
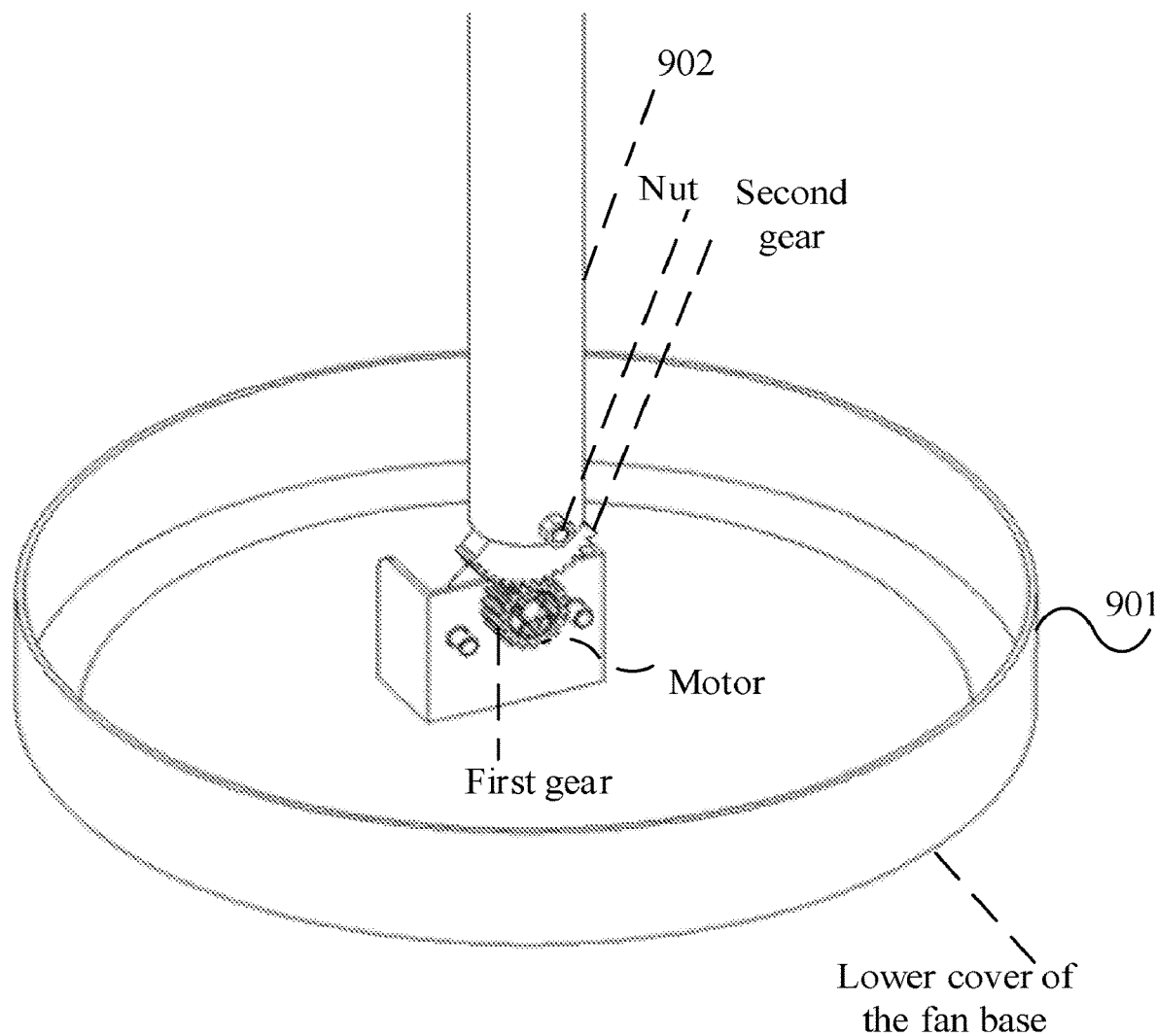
FIG. 11B is a schematic view of a three-dimensional structure of a fan with its fan base being not covered by an upper cover in accordance with an exemplary aspect of the present disclosure.

As shown in FIGS. 11A and 11B, the support rod control device includes a motor mounted on the fan base and having a first gear and a second gear engaged with the first gear. Thus, when the motor rotates, it will drive rotation of the second gear such that the swingable support rod swings to the left or the right. Further, as shown in FIGS. 11A and 11B, when the motor rotates to the left (i.e. rotates clockwise, that is seen from the fan), the second gear follows to rotate to the left such that the swingable support rod swings to the right. Thus, rotation direction of the motor is opposite to swing direction of the swingable support rod. When the swingable support rod swings to the right, it indicates that the swingable support rod moves to the right (seen from the fan) away from the user and thus the user is located in the left front of the fan head. In order to aim at the user to blow air as much as possible, the fan head should be turned left (as shown in FIG. 12B, seen from the fan). Thus, rotation direction of the axial rotation angle is also opposite to the swing direction of the swingable support rod.

In one aspect, the step S101 shown in FIG. 1, i.e., the acquiring the current swing angle of the swingable support rod, may include: acquiring a rotation angle of the motor; and determining the rotation angle of the motor as the current swing angle.

Since the rotation angle of the motor is the rotation angle of the first gear, the first gear is engaged with the second gear such that the first gear has the same rotation angle as the second gear, and the second gear is also integral with the swingable support rod such that the rotation angle of the second gear is equal to the swing angle the swingable support rod, so the swing angle of the swingable support rod may be considered as the rotation angle of the motor.

The motor may be a stepping motor, so that the rotation angle of the stepping motor can be determined based on the number of rotation steps of the stepping motor and the angles corresponding to respective steps.

Figure 2:
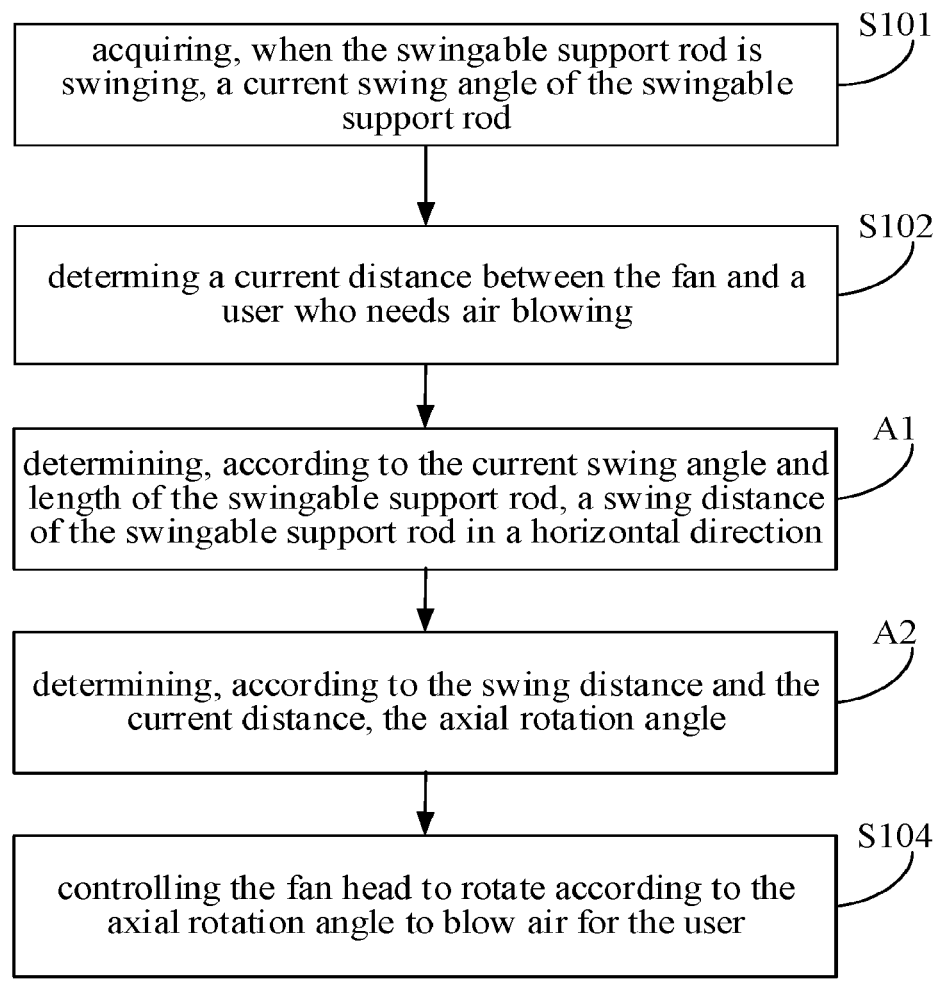
FIG. 2 is a flow diagram of another method for controlling a fan in accordance with an exemplary aspect of the present disclosure.

FIG. 2 is a flow diagram of another method for controlling a fan in accordance with an exemplary aspect.

As shown in FIG. 2, in one aspect, the step S103 shown in FIG. 1, that is, the determining, according to the current distance and the current swing angle, an axial rotation angle of the fan head that is currently required to be reached may include steps A1 and A2.

In step A1, according to the current swing angle (as indicated by the first angle in FIG. 12A) and length of the swingable support rod (as indicated by the length b in FIG. 12A), a swing distance of the swingable support rod in a horizontal direction (as indicated by the length a in FIG. 12A) is determined.

The swing distance of the swingable support rod in the horizontal direction is a projection distance in the horizontal direction of a straight-line distance between the current position of the fan head (i.e., the second position) in the case that the swingable support rod swings from a most recently determined history swing angle until current time to reach the current swing angle and the initial position of the fan head when the swingable support rod is in the longitudinal state.

In step A2, according to the swing distance and the current distance, the axial rotation angle is determined.

In the determining the axial rotation angle that is required to be reached of the fan head, as shown in FIG. 12A, it is possible to establish, in a longitudinal plane where the swingable support rod is in (i.e., the plane after the swingable support rod swings back and forth (e.g., to the left and to the right) from its initial state), a triangle with the longitudinal straight line where the swingable support rod is located in when it is in the initial state, the straight line where the swingable support rod is located in when it swings and reaches to the current swing angle, and three points on the straight lines, i.e. the position 1 where the fan head is at when the swingable support rod is in the initial state (i.e. the initial position of the fan head), the position 2 where the fan head is at after swinging of the swingable support rod (i.e. the second position of the fan head currently) and the bottom of the swingable support rod (the bottom of the swingable support rod may be the bottom of the second gear mounted on the swingable support rod), and to establish, within the triangle, a right-angle triangle, and thus determines the swing distance a of the swingable support rod in the horizontal direction according to the Pythagorean theorem, and then determine, according to the swing distance a and the current distance (the vertical distance 1 or the hypotenuse thereof), the swing angle of the fan head that is required to be reached in the horizontal direction (i.e. the desired axial rotation angle, shown by the second angle in FIG. 12B).

The right-angled triangle shown in FIG. 12B is established according to a swing distance a in the horizontal direction after the swingable support rod swings from its initial state to reach the current swing angle, projection points (i.e. the position 1' and the position 2') of the position 1 and the position 2 where the center of the fan head is located respectively on the ground and the position where the user is located. Further, the plane of the right-angled triangle is perpendicular to a horizontal plane of the swingable support rod. The swing distance a is used as one right-angle side of the right-angle triangle, with its two ends being the position 1' and the position 2', respectively.

Figure 3:
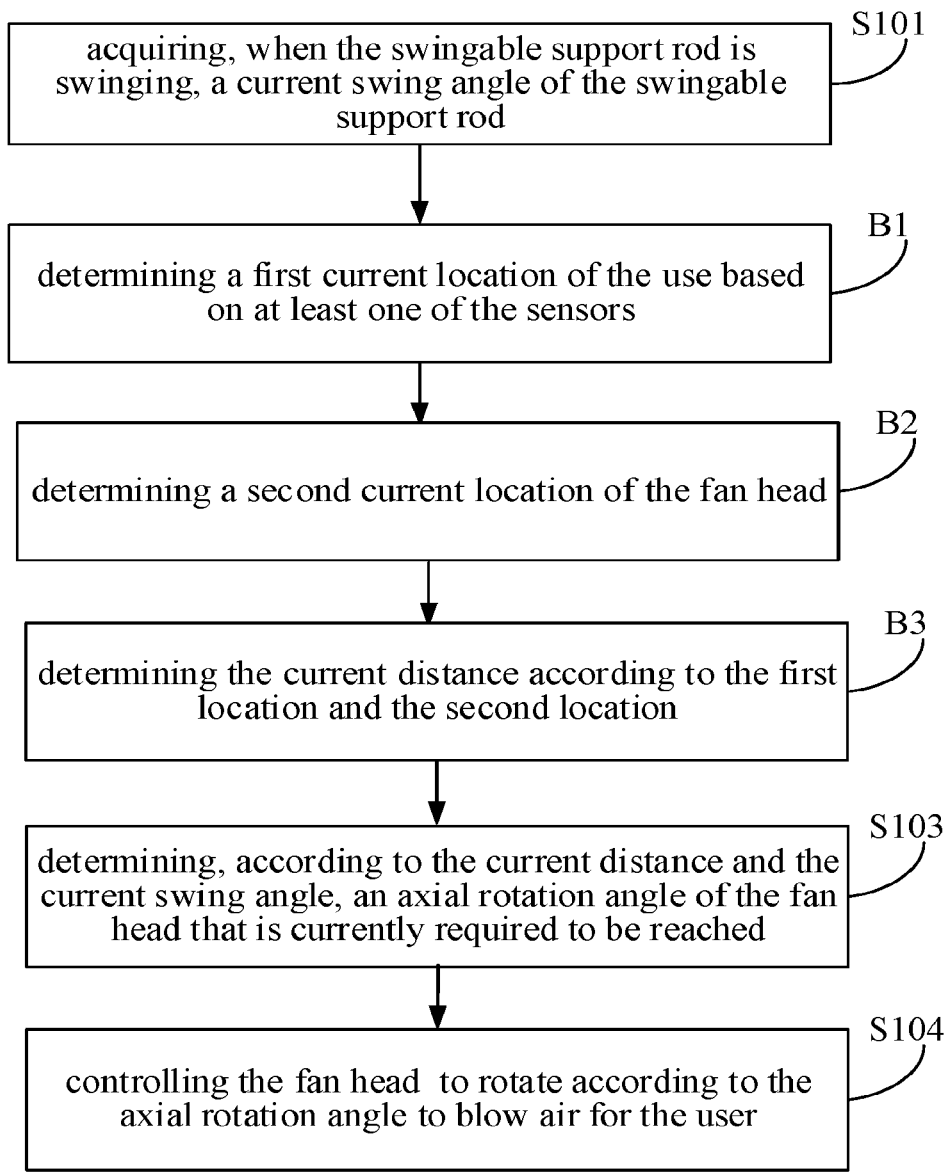
FIG. 3 is a flow diagram of yet another method for controlling a fan in accordance with an exemplary aspect of the present disclosure.

FIG. 3 is a flow diagram of yet another method for controlling a fan in accordance with an exemplary aspect.

As shown in FIG. 3, in one aspect, the swingable support rod is provided with at least one of the following sensors: an infrared ranging sensor, a position sensor, an infrared image sensor.

The step S102 shown in FIG. 1, i.e., the determining the current distance between the fan and the user who needs air blowing may include steps B1 through B3.

In step B1, a first position where the user is located currently is determined based on at least one of the sensors (as indicated by the user position in FIG. 12B).

In the case where the first position of the user is detected by an infrared ranging sensor or an infrared image sensor, it can be determined by transmission of infrared rays.

In step B2, a second position wherein the fan head is located currently is determined.

The second position of the fan head may be a position where the fan head is located currently in the space. The current position of the fan head may be detected by the fan itself, or obtained through detection by another device associated with the fan of the current position of the fan head and transmission of the same to the fan (for example, the current position of the fan head may be detected by using infrared rays).

The position 1 and the position 2 in FIG. 12A respectively indicate positions of the fan head is in the space when the swingable support rod is in its initial state and the swingable support rod swings from the initial state to reach the current swing angle. The position 1' and the position 2' in FIG. 12B respectively indicate projection positions of the positions of the fan head is in the space when the swingable support rod is in its initial state and the swingable support rod swings from the initial state to reach the current swing angle on the ground. The projection position of the position 1 is the position 1', and the projection position of the position 2 is the position 2'.

In step B3, the current distance is determined according to the first location and the second location. In calculation of the current distance, the first position can be used as the starting point of the distance.

According to the first location of the user and the second position of the fan, the current distance between the two positions can be accurately calculated. The current distance may be a vertical distance or straight-line distance between the user and the fan head. As shown in FIG. 12B, when the fan head is currently at position 2 (i.e., the second position is at the position 2), the current distance may be the vertical distance 1 or hypotenuse corresponding to the e vertical distance 1.

In one aspect, the current distance may include a straight-line distance between the fan head and the user, or the current distance may include a vertical distance between a longitudinal plane in which the swingable support rod is located and the user.

The current distance may be a vertical distance between a longitudinal plane in which the swingable support rod is located and the user or a straight-line distance between the fan head and the use (i.e. the straight-line distance between the center of the fan head and the use). As shown in FIG. 12B, when the fan head is at the position 2, the current distance may be the vertical distance 1 or the hypotenuse corresponding to the vertical distance 1.

Figure 4:
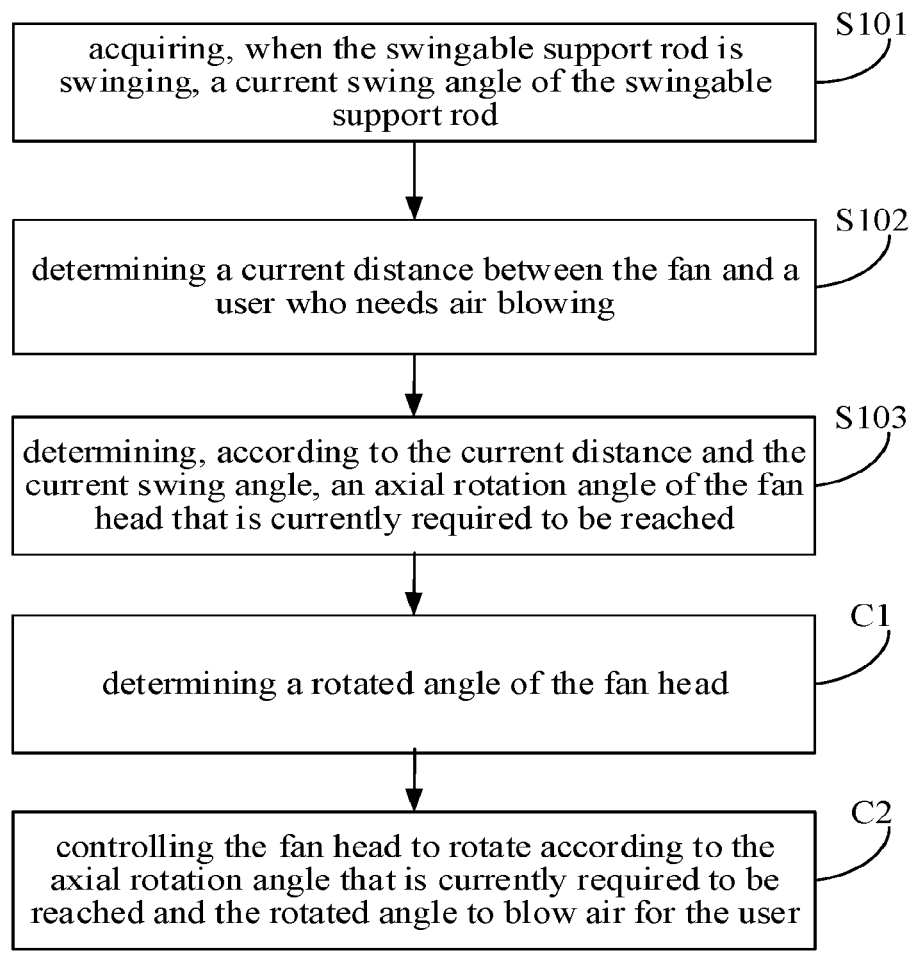
FIG. 4 is a flow diagram of a further method for controlling a fan in accordance with an exemplary aspect of the present disclosure.

FIG. 4 is a flow diagram of a further method for controlling a fan in accordance with an exemplary aspect.

As shown in FIG. 4, in one aspect, the step S104 shown in FIG. 1, i.e., the controlling the fan head to rotate according to the axial rotation angle to blow air for the user, may include steps C1 to C2.

In step C1, a rotated angle of the fan head is determined.

The rotated angle of the fan head is the (axial) rotation angle of the fan head most recently determined. In the case that the present aspect (i.e. the step S101 to step S104) is performed at predetermined time intervals, the rotated angle of the fan head is the (axial) rotation angle of the fan head determined at the most recent time interval. Similarly, the history swing angle most recently determined is the swing angle of the swingable support rod determined at the most recent time interval relative to its initial state.

In the case that the present aspect is performed in real time, the rotated angle is the (axial) rotation angle of the fan head determined at last time. Similarly, the history swing angle most recently determined is the swing angle of the swingable support rod determined at last time relative to its initial state.

In step C2, the fan head is controlled to rotate according to the axial rotation angle that is currently required to be reached and the rotated angle to blow air for the user. The rotated angle is an axial rotation angle of the fan head that is most recently determined.

The swingable support rod continues to swing, so it is not necessarily in its initial state (that is, the rotated angle is not necessarily zero) when axial rotation angle of the fan head is most recently determined. Further, the rotation angle of the fan head varies as change in the current swing angle of the swingable support rod. Thus, the fan head has been rotated by a certain angle when its axial rotation angle is most recently determined. Therefore, in order to control the fan head to rotate according to its axial rotation angle, it is possible to control the fan head to rotate according to an axial rotation angle which is required to be reached currently and an axial rotation angle that has been reached (i.e. the rotated angle), by which it is able to adjust rotation angle of the fan head in real time during swinging of the swingable support rod so as to increase air blowing range as much as possible to blow air for the user directly.

In particular, during leftward and rightward swinging of the swingable support rod, a desired rotation angle of the fan head relative to the horizontal direction may gradually increase (for example, when the swingable support rod swings from its initial state to its maximum leftward/rightward swing amplitude, the desired rotation angle of the fan head increases gradually), gradually decrease (for example, when the swingable support rod swings back from its maximum leftward/rightward swing amplitude to its initial state, the desired rotation angle of the fan head decreases gradually), gradually decrease and then gradually increase (for example, when the swingable support rod swings from its maximum leftward/rightward swing amplitude to its initial state and then swings from its maximum leftward/rightward swing amplitude to its initial state, the desired rotation angle of the fan head decreases gradually and then increase gradually), so the desired axial rotation angle may be greater than or smaller than the rotated angle. Thus, the step C2 may be performed by controlling the fan head to rotate by a target angle, wherein the target angle is equal to an absolute value of an angle difference between the desired axial rotation angle and the rotated angle, and direction of the fan head when it is rotated by the target angle is the rotation direction of the motor in the support rod control device (for example, if the motor in the support rod control device rotates rightward (in clockwise), the fan head also rotates rightward by the target angle, while if the motor in the support rod control device rotates leftward (in counterclockwise), the fan head also rotates leftward by the target angle (see from the fan)).

In addition, since there may be a calculation delay from acquisition of the current swing angle of the swingable support rod to calculation of an axis rotation angle that is currently required, for example, a delay of several milliseconds, the target angle can be slightly modified before the fan head is controlled to rotate by the target angle, such that the fan head is controlled to rotate by a modified target angle, which enables the fan head to always rotate, during swing of the swingable support rod, with a most suitable angle as much as possible, in order to ensure the fan head blows air directly to the user as much as possible while the air blowing range can be increased so that the user have most comfortable experiences as much as possible. If the user does not require the fan head to blow air directly to himself, the modification may be ignored.

The aspects of the present disclosure also provide a device for controlling a fan, which is corresponding to the above-described method for controlling a fan in the present disclosure.

Figure 5:
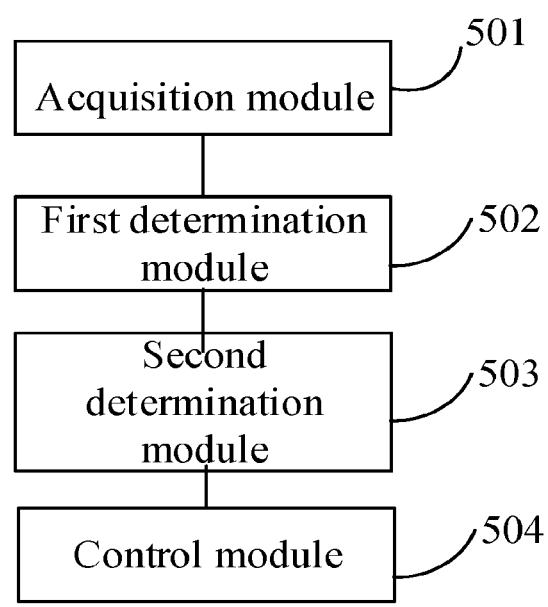
FIG. 5 is a block diagram of a device for controlling a fan in accordance with an exemplary aspect of the present disclosure.

FIG. 5 is a block diagram of a device for controlling a fan according to an exemplary aspect.

As shown in FIG. 5, the device includes an acquisition module 501, a first determination module 502, a second determination module 503, and a control module 504.

The acquisition module 501 is configured to acquire, when a swingable support rod is swinging, a current swing angle of the swingable support rod, wherein swinging of the swingable support rod is controlled by the support rod control device provided between the swingable support rod and the fan base.

The first determination module 502 is configured to determine a current distance between the fan and a user who needs air blowing.

The second determination module 503 is configured to determine, according to the current distance and the current swing angle, an axial rotation angle of the fan head that is currently required to be reached.

The control module 504 is configured to control the fan head to rotate according to the axial rotation angle to blow air for the user.

By acquiring by the acquisition module 501, when a swingable support rod is swinging, the current swing angle of the swingable support rod, determining by the first determination module 502 the current distance between the fan and a user who needs air blowing, determining by the second determination module 503, according to the current distance and the current swing angle, an axial rotation angle of the fan head that is currently required to be reached, it is able to not only increase air blowing range, but also ensure that the fan head always aims at the user to blow air (i.e. the fan head blows air directly to the user) during swinging of the swingable support rod as much as possible by the control module 504 controlling the fan head to make rotation axially, and thereby user's comfortable experiences can be improved.

In one aspect, the support rod control device may include: a motor having a first gear, wherein the motor is mounted on the fan base, and wherein the swingable support rod has a second gear on its bottom, the second gear being engaged with the first gear. The motor is operable to: drive, upon rotation, the second gear by the first gear to rotate so that the swingable support rod swings, wherein rotation direction of the motor is opposite to swing direction of the swingable support rod, and rotation direction of the axial rotation angle is opposite to the swing direction of the swingable support rod.

As shown in FIGS. 11A and 11B, the support rod control device includes a motor mounted on the fan base and having a first gear and a second gear engaged with the first gear. Thus, when the motor rotates, it will drive rotation of the second gear such that the swingable support rod swing to the left or the right. Further, as shown in FIGS. 11A and 11B, when the motor rotates to the left (i.e. rotates clockwise, that is seen from the fan), the second gear follows to rotate to the left such that the swingable support rod swings to the right. Thus, rotation direction of the motor is opposite to swing direction of the swingable support rod. When the swingable support rod swings to the right, it indicates that the swingable support rod moves to the right (seen from the fan) to derivate from the user and thus the user is located in the left front of the fan head. In order to aim at the user to blow air as much as possible, the fan head should be turned left (as shown in FIG. 12B, seen from the fan). Thus, rotation direction of the axial rotation angle is also opposite to the swing direction of the swingable support rod.

In one aspect, the acquisition module 501 may include: an acquisition sub-module configured to acquire a rotation angle of the motor; and a first determination sub-module configured to determine the rotation angle of the motor as the current swing angle.

Since the rotation angle of the motor is the rotation angle of the first gear, the first gear is engaged with the second gear such that the first gear has the same rotation angle as the second gear, and the second gear is also integral with the swingable support rod such that the rotation angle of the second gear is equal to the swing angle the swingable support rod, so the swing angle of the swingable support rod may be considered as the rotation angle of the motor.

The motor may be a stepping motor, so that the rotation angle of the stepping motor can be determined based on the number of rotation steps of the stepping motor and the angles corresponding to respective steps.

Figure 6:
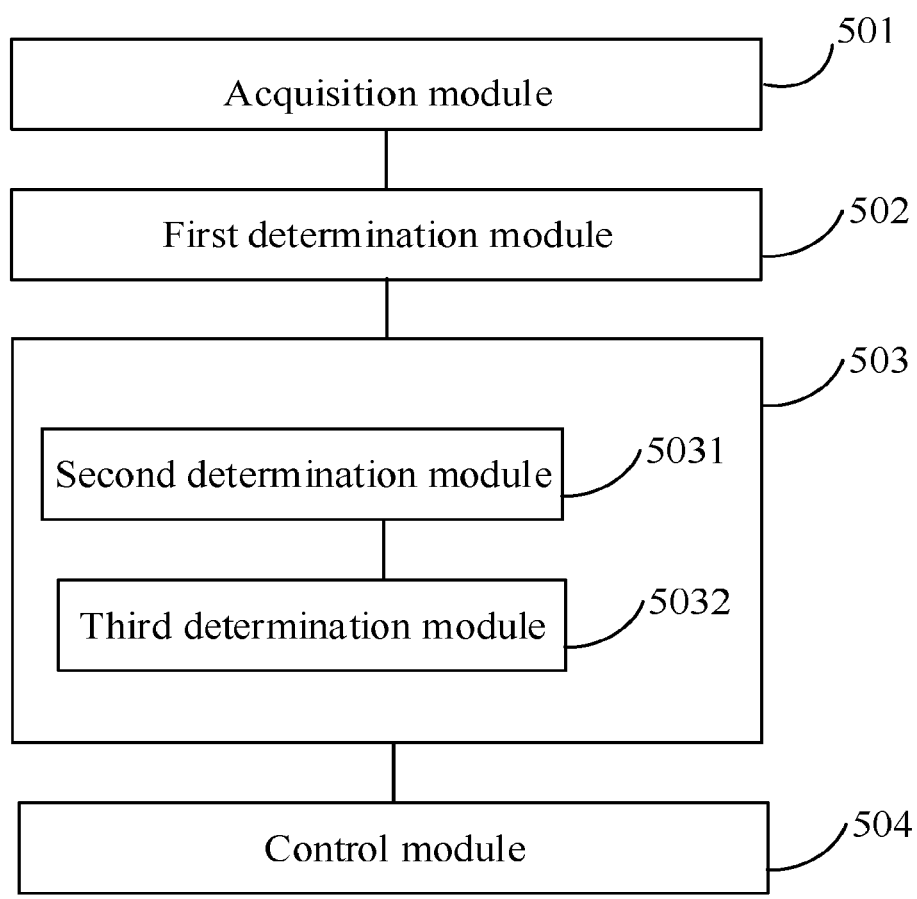
FIG. 6 is a block diagram of another device for controlling a fan in accordance with an exemplary aspect of the present disclosure.

FIG. 6 is a block diagram of another device for controlling a fan in accordance with an exemplary aspect.

As shown in FIG. 6, in one aspect, the second determination module 503 may include a second determination sub-module 5031 and a third determination sub-module 5032.

The second determination sub-module 5031 is configured to determine a swing distance of the swingable support rod in a horizontal direction (as indicated by the length a in FIG. 12A) according to the current swing angle (as indicated by the first angle in FIG. 12A) and length of the swingable support rod (as indicated by the length b in FIG. 12A).

The third determination sub-module 5032 is configured to determine the axial rotation angle according to the swing distance and the current distance.

When the second determination sub-module 5031 determines the axial rotation angle of the fan head, as shown in FIG. 12A, it is possible for the second determination sub-module 5031 to establish, in a longitudinal plane where the swingable support rod is in, a triangle with the longitudinal straight line where the swingable support rod is located in when it is in the initial state, the straight line where the swingable support rod is located in when it swings and reaches to the current swing angle, and three points on the straight lines, i.e. the position 1 where the fan head is at when the swingable support rod is in the initial state (i.e. the initial position of the fan head), the position 2 where the fan head is at after swinging of the swingable support rod (i.e. the second position of the fan head currently) and the bottom of the swingable support rod, and to establish, within the triangle, a right-angle triangle, and thus determines the swing distance a of the swingable support rod in the horizontal direction according to the Pythagorean theorem, and then the third determination sub-module 5032 determines, according to the swing distance a and the current distance (the vertical distance 1 or the hypotenuse thereof), the swing angle of the fan head that is required to be reached in the horizontal direction (i.e. the desired axial rotation angle, shown by the second angle in FIG. 12B). The right-angled triangle shown in FIG. 12B is established according to a swing distance a in the horizontal direction after the swingable support rod swings from its initial state to reach the current swing angle, projection points (i.e. the position 1' and the position 2') of the position 1 and the position 2 where the center of the fan head is located respectively on the ground and the position where the user is located. Further, the plane of the right-angled triangle is perpendicular to a horizontal plane of the swingable support rod. The swing distance a is used as one right-angle side of the right-angle triangle, with its two ends being the position 1' and the position 2', respectively.

Figure 7:
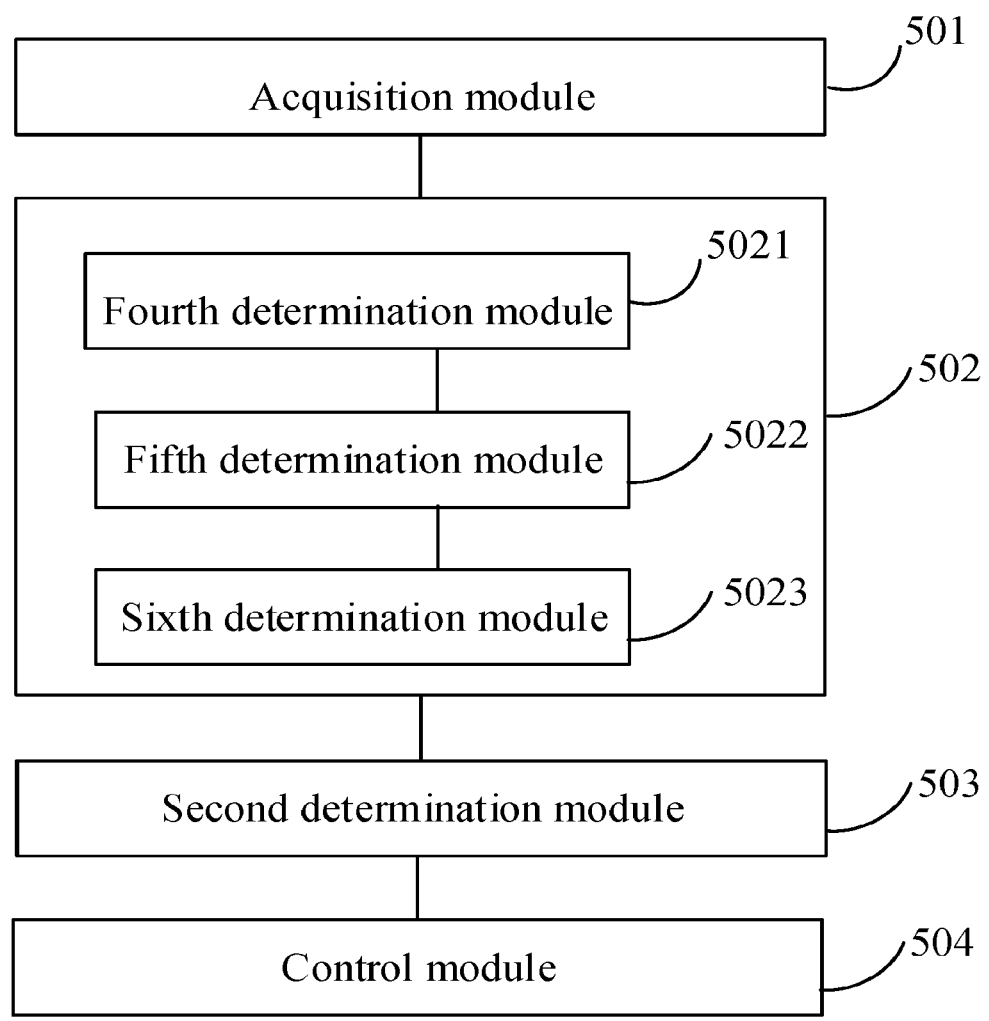
FIG. 7 is a block diagram of yet another device for controlling a fan in accordance with an exemplary aspect of the present disclosure.

FIG. 7 is a block diagram of yet another device for controlling a fan in accordance with an exemplary aspect.

As shown in FIG. 7, in one aspect, the swingable support bar may be provided with at least one of the following sensors: an infrared ranging sensor, a position sensor, an infrared image sensor.

The first determining module 502 may include a fourth determining sub-module 5021, a fifth determining sub-module 5022, and a sixth determining sub-module 5023.

The fourth determining sub-module 5021 is configured to determine a first current location of the user based on at least one of the sensors.

The fifth determining sub-module 5022 is configured to determine a second current location of the fan head.

The sixth determining sub-module 5023 is configured to determine the current distance according to the first location and the second location.

The sixth determining sub-module 5023 accurately calculate, according to the first location of the user determined by the fourth determination sub-module 5021 and the second position of the fan determined by the fifth determination sub-module 5022, the current distance between the two positions. The current distance may be a straight-line distance between the user and the fan head, or a vertical distance between a longitudinal plane in which the swingable support rod is located and the user. As shown in FIG. 12B, when the fan head is currently at position 2, the current distance may be the vertical distance 1 or hypotenuse corresponding to the e vertical distance 1.

In one aspect, the current distance may include a straight-line distance between the fan head and the user, or the current distance may include a vertical distance between a longitudinal plane in which the swingable support rod is located and the user.

Figure 8:
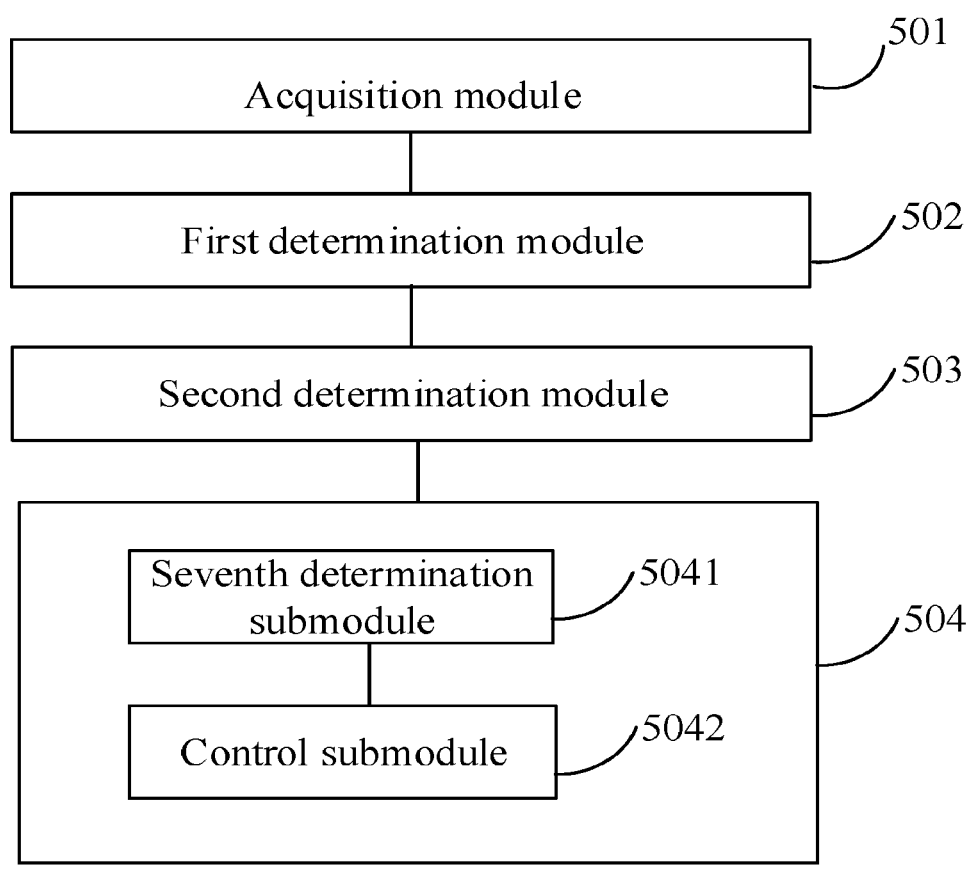
FIG. 8 is a block diagram of a further device for controlling a fan in accordance with an exemplary aspect of the present disclosure.

FIG. 8 is a flow diagram of a further device for controlling a fan in accordance with an exemplary aspect.

As shown in FIG. 8, in one aspect, the control module 504 may include a seventh determining sub-module 5041 and a control sub-module 5042.

The seventh determining sub-module 5041 is configured to determine a rotated angle of the fan head.

The control sub-module 5042 is configured to control the fan head to rotate according to the axial rotation angle that is currently required to be reached and the rotated angle to blow air for the user. The rotated angle is an axial rotation angle of the fan head that is most recently determined.

The swingable support rod continues to swing, so it is not necessarily in its initial state (that is, the rotated angle is not necessarily zero) when axial rotation angle of the fan head is most recently determined. Further, the rotation angle of the fan head varies as change in the current swing angle of the swingable support rod. Thus, the fan head has been rotated by a certain angle when its axial rotation angle is most recently determined. Therefore, in order for the control module 504 control the fan head to rotate according to its axial rotation angle, it is possible to control by the control sub-module 5042 the fan head to rotate according to an axial rotation angle which is required to be reached currently and an axial rotation angle that has been reached (i.e. the rotated angle) recorded by the seventh determination sub-module 5041, by which it is able to adjust rotation angle of the fan head in real time during swinging of the swingable support rod so as to increase air blowing range as much as possible to blow air for the user directly.

In particular, during leftward and rightward swinging of the swingable support rod, a desired rotation angle of the fan head relative to the horizontal direction may gradually increase (for example, when the swingable support rod swings from its initial state to its maximum leftward/rightward swing amplitude, the desired rotation angle of the fan head increases gradually), gradually decrease (for example, when the swingable support rod swings back from its maximum leftward/rightward swing amplitude to its initial state, the desired rotation angle of the fan head decreases gradually), gradually decrease and then gradually increase (for example, when the swingable support rod swings from its maximum leftward/rightward swing amplitude to its initial state and then swings from its maximum leftward/rightward swing amplitude to its initial state, the desired rotation angle of the fan head decreases gradually and then increase gradually), so the desired axial rotation angle may be greater than or smaller than the rotated angle. Thus, the control sub-module 5042 may be configured to control the fan head to rotate by a target angle, wherein the target angle is equal to an absolute value of an angle difference between the desired axial rotation angle and the rotated angle, and direction of the fan head when it is rotated by the target angle is the rotation direction of the motor in the support rod control device (for example, if the motor in the support rod control device rotates rightward (in clockwise), the fan head also rotates rightward by the target angle, while if the motor in the support rod control device rotates leftward (in counterclockwise), the fan head also rotates leftward by the target angle (see from the fan)).

In addition, since there may be a calculation delay from acquisition of the current swing angle of the swingable support rod to calculation of an axis rotation angle that is currently required, for example, a delay of several milliseconds, the target angle can be slightly modified before the fan head is controlled to rotate by the target angle, such that the fan head is controlled to rotate by a modified target angle, which enables the fan head to always rotate, during swing of the swingable support rod, with a most suitable angle as much as possible, in order to ensure the fan head blows air directly to the user as much as possible while the air blowing range can be increased so that the user have most comfortable experiences as much as possible.

Figure 9:
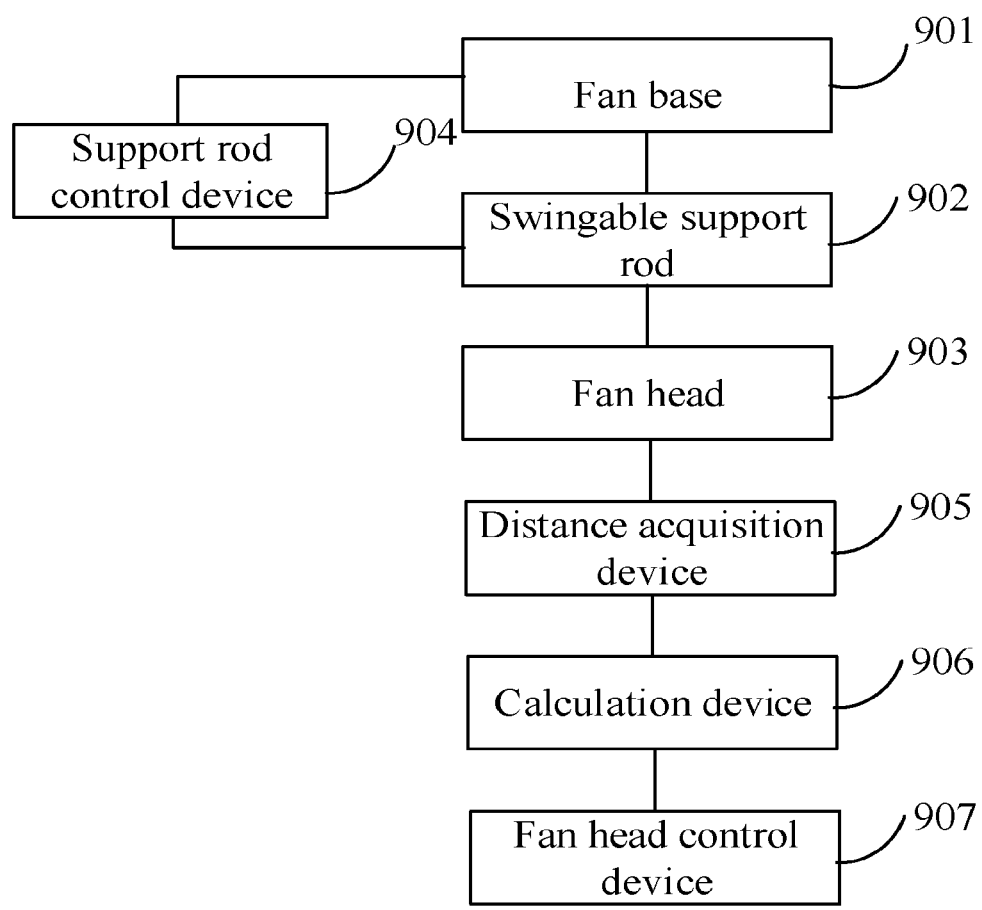
FIG. 9 is a block diagram a fan in accordance with an exemplary aspect of the present disclosure.
Figure 10A:
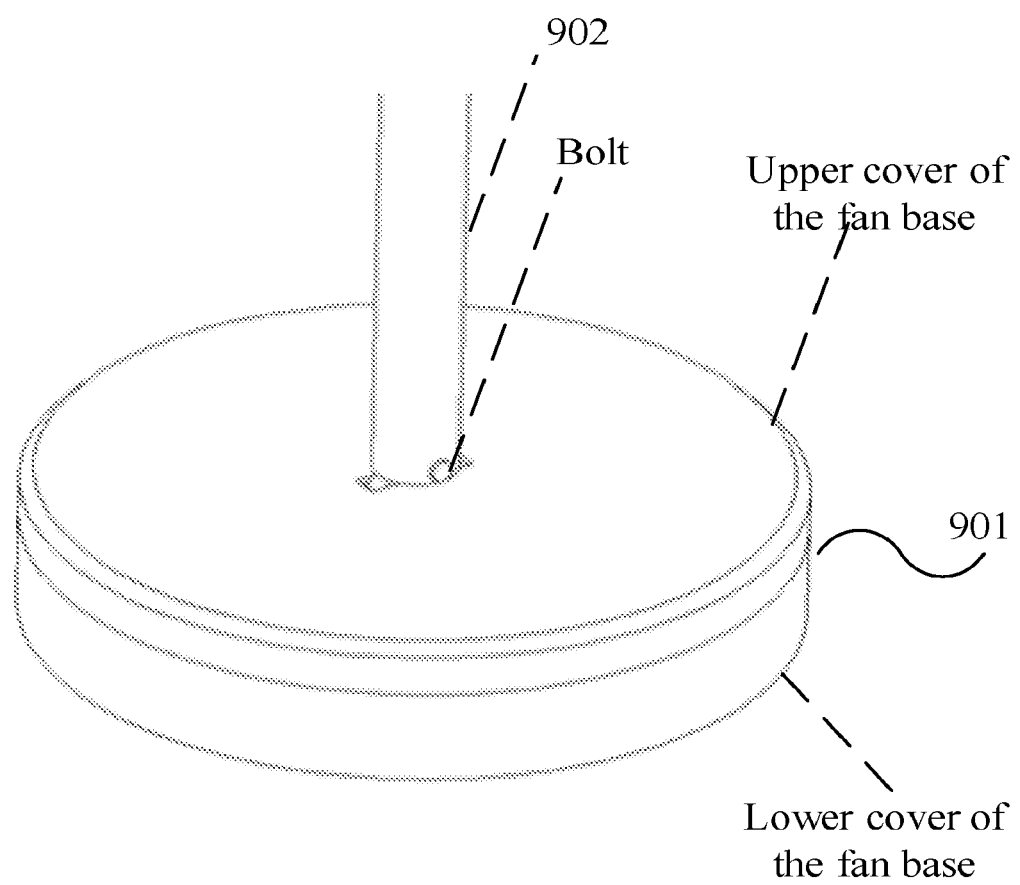
FIG. 10A is a schematic view of a three-dimensional structure of a fan with its fan base being covered by an upper cover in accordance with an exemplary aspect of the present disclosure.
Figure 10B:
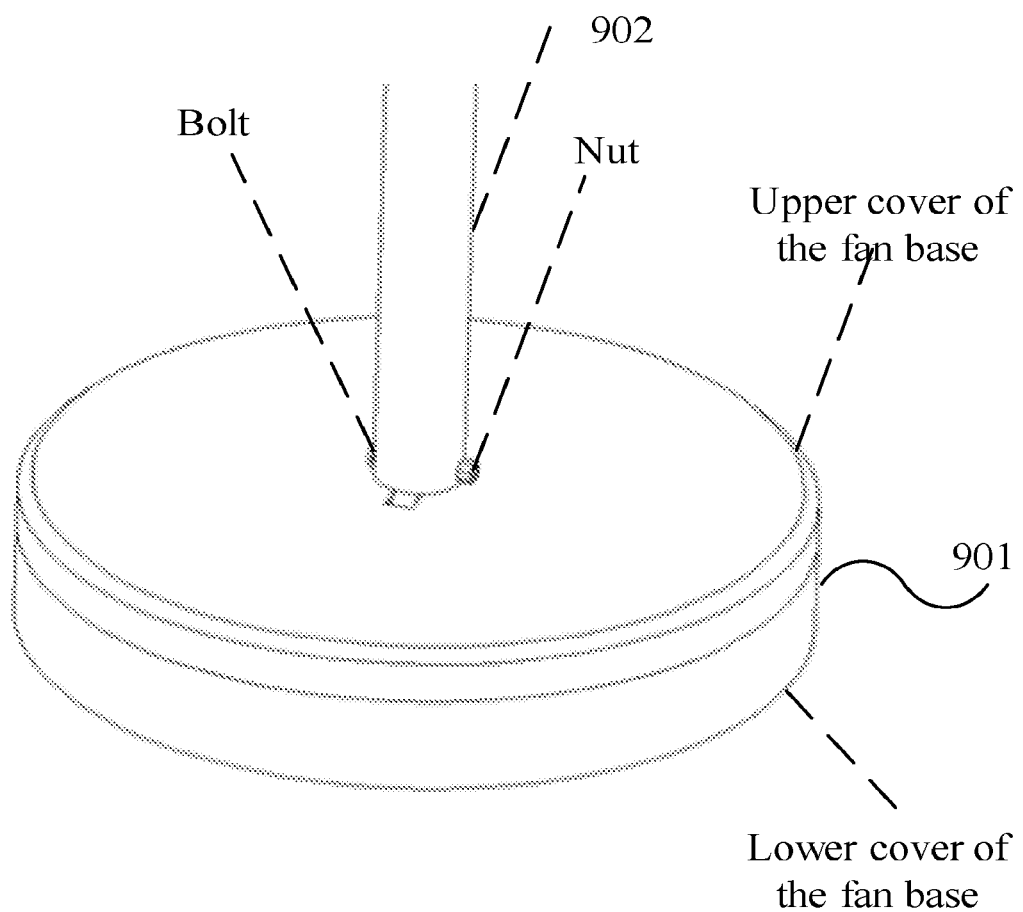
FIG. 10B is a schematic view of a three-dimensional structure of a fan with its fan base being covered by an upper cover in accordance with an exemplary aspect of the present disclosure.

Further, FIG. 9 is a block diagram a fan in accordance with an exemplary aspect; FIG. 10A is a schematic view of a three-dimensional structure of its fan base being covered by an upper cover in accordance with an exemplary aspect; FIG. 10B is a schematic view of a three-dimensional structure of a fan with its fan base being covered by an upper cover in accordance with an exemplary aspect; FIG. 11A is a schematic view of a three-dimensional structure of a fan without its fan base being not covered by an upper cover in accordance with an exemplary aspect; FIG. 11B is a schematic view of a three-dimensional structure of a fan its fan base being not covered by an upper cover in accordance with an exemplary aspect; FIG. 12A is a diagram illustrating calculation of a swing distance of a swingable support rod in a horizontal direction with reference to a longitudinal plane in which the swingable support rod is located during swinging in accordance with an exemplary aspect; and FIG. 12B is a diagram illustrating calculation of an axial rotation angle with reference to a horizontal plane perpendicular to the swingable support rod in accordance with an exemplary aspect.

FIGS. 10A and 11A are three-dimensional views of the fan seen from point of view of a bolt mounted at the bottom of the swingable support rod, while FIG. 10B and FIG. 11B are three-dimensional views of the fan seen from point of view of a nut fitted with the bolt mounted at the bottom of the swingable support rod. In FIGS. 10A and 10B, the fan base is covered with an upper cover; but in FIGS. 11A and 11B, the fan base is not covered by an upper cover. In addition, the bolt and nut mounted at the bottom of the swingable support rod are used to secure the second gear on the swingable support rod.

The present disclosure will now be described in details with reference to FIGS. 9 to 12B.

As shown in FIGS. 9 to 12B, there is also provided a fan according to a third aspect of aspects of the present disclosure. The fan includes: a fan base 901; a fan head 903; a swingable support rod 902 provided between the fan base 901 and the fan head 903. By setting the swingable support rod 902 between the fan base and the fan head 903, it is able to increase air blowing range by swinging of the support rod and thereby user's comfortable experiences can be improved.

The fan also includes: a support rod control device 904 provided between the swingable support rod 902 and the fan base 901, and configured to control swing of the swingable support rod 902. The support rod control device 904 acquires, when the swingable support rod 902 is swinging, a current swing angle of the swingable support rod 902.

The current swing angle is an angle between a straight line where the current swing position of the swingable support rod 902 is in and a longitudinal line where the swingable support rod 902 is in when it is in a longitudinal state, shown as the first angle in FIG. 12A.

It should be noted that the aspects of the present disclosure considers a state in which the swingable support rod 902 is in a longitudinal state as an initial state of the swingable support rod 902, and when the swingable support rod 902 is in the initial state, the current swing angle is zero. Further, in the aspects of the present disclosure, it is assumed that when the swingable support rod 902 is in its initial state (i.e., in a longitudinal state), the fan head 903 is also in its initial state where the angle between its located plane and the horizontal direction is zero, that is, the fan head is facing right forward. Furthermore, when the swingable support rod 902 is returned to the longitudinal state after swinging, it is considered that the swingable support rod 902 moves back to its initial state again, and likewise, the fan head 903 is again returned to its initial status.

The fan base 901 should have sufficient weight to keep the fan in a stable state during rightward and leftward swinging of the swingable support bar 902, but the weight should not be too high such that it can be moved by the user easily. Thus, the fan base 901 should have a suitable weight. The fan base 901 has an upper cover with an opening. The length of the opening can be set according to the maximum leftward and rightward swing amplitudes of the swingable support rod 902 such that it does not hinder the swingable support rod 902 to reach the maximum leftward and rightward swing amplitudes.

In addition, in the aspects of the present disclosure, it is assumed that when the swingable support rod 902 is in its first initial state, a user is located in front of the fan head 903 and the fan head 903 is capable of blowing air to the user.

Further, since the swinging of the swingable support rod 902 and turning round of the fan head 903 are all implemented by the fan itself, the present disclosure, when referring to left/right hereinafter, intends to indicate it is seen from the fan. It should be understood by those skilled in the art that the left/right seen from the fan is just opposite to that seen from the user.

In addition, in aspects of the present disclosure, FIGS. 12A and 12B is used to illustrate, by an example where the swingable support rod 902 swings from its initial state (the most recently determined history swing angle is zero) by the current swing angle rightward (seen from the fan, but the swing direction of the swingable support rod is leftward if seen from the user) to a certain position, calculation of a swing distance of the swingable support rod 902 in the horizontal direction and an axial rotation angle that is required to be reached in order to assist understanding of those skilled in the art, does not indicate the swingable support rod 902 always swings in this way.

Further, the fan includes a distance acquisition device 905 that determines a current distance between the fan and a user who needs air blowing.

The current distance can be obtained by various sensors such as an infrared ranging sensor, and the two end points of the current distance are the user and the fan head 903, such as the center point of the user and the fan head. The current distance may include a straight-line distance between the fan head and the user (the hypotenuse as shown in FIG. 12B), or, the current distance may include a vertical-line distance between a longitudinal plane in which the swingable support rod is located and the user (the Distance 1 as shown in FIG. 12B).

Further, the fan includes a calculation device 906 that determines, according to the current distance and the current swing angle, an axial rotation angle of the fan head 903 that is currently required to be reached.

The axial rotation angle is an angle of the fan head 903, after swinging, relative to a desired axial rotation of the swingable support rod in the horizontal direction, that is, an angle between a plane where the fan head 903 is in during swinging and the desired axial rotation (As shown in FIGS. 12A and 12B, it is assumed that the swingable support rod 902 swings from its initial state to the right (seen from the fan) so that the fan head 903 reaches the position 2 from the position 1. In this situation, in order to enable the fan to always blow air to the user, the fan head 903 should swing leftward by a second angle, which is an angle between a plane in which the fan head is at the position 2 and a desired swing in the horizontal direction). In addition, the axial rotation angle can be attained by a motor that controls the swinging of the fan head.

Further, the fan includes a head control device 907 that controls the fan head 903 to rotate according to the axial rotation angle to blow air for the user.

By acquiring, when a swingable support rod 902 is swinging, the current swing angle of the swingable support rod 902, determining the current distance between the fan and a user who needs air blowing, determining, according to the current distance and the current swing angle, an axial rotation angle of the fan head 903 that is currently required to be reached, it is able to not only increase air blowing range by through swinging of the swingable support rod 902, but also ensure that the fan head 903 always aims at the user to blow air during swinging of the swingable support rod 902 as much as possible by controlling the fan head 903 to make rotation axially, and thereby user's comfortable experiences can be improved.

In one aspect, the support rod control device 904 may include: a motor having a first gear, wherein the motor is mounted on the fan base 901, and wherein the swingable support rod 902 has a second gear on its bottom, the second gear being engaged with the first gear. The motor is operable to: drive, upon rotation, the second gear by the first gear to rotate so that the swingable support rod 902 swings, wherein rotation direction of the motor is opposite to swing direction of the swingable support rod 902, and rotation direction of the axial rotation angle is opposite to the swing direction of the swingable support rod 902.

As shown in FIGS. 11A and 11B, the support rod control device 904 includes a motor mounted on the fan base 901 and having a first gear and a second gear engaged with the first gear. Thus, when the motor rotates, it will drive rotation of the second gear such that the swingable support rod 902 swings to the left or the right. Further, as shown in FIGS. 11A and 11B, when the motor rotates to the left (i.e. rotates clockwise, that is seen from the fan), the second gear follows to rotate to the left such that the swingable support rod 902 swings to the right. Thus, rotation direction of the motor is opposite to swing direction of the swingable support rod 902. When the swingable support rod 902 swings to the right, it indicates that the swingable support rod 902 moves to the right (seen from the fan) away from the user and thus the user is located in the left front of the fan head. In order to aim at the user to blow air as much as possible, the fan head should be turned left (as shown in FIG. 12B, seen from the fan). Thus, rotation direction of the axial rotation angle is also opposite to the swing direction of the swingable support rod 902.

In one aspect, the support rod control device 904 may be configured to: acquire a rotation angle of the motor; and determine the rotation angle of the motor as the current swing angle.

Since the rotation angle of the motor is the rotation angle of the first gear, the first gear is engaged with the second gear such that the first gear has the same rotation angle as the second gear, and the second gear is also integral with the swingable support rod 902 such that the rotation angle of the second gear is equal to the swing angle the swingable support rod 902, so the swing angle of the swingable support rod 902 may be considered as the rotation angle of the motor.

The motor may be a stepping motor, so that the rotation angle of the stepping motor can be determined based on the number of rotation steps of the stepping motor and the angles corresponding to respective steps.

In one aspect, the calculation device 906 may be configured to: determine a swing distance of the swingable support rod 902 in a horizontal direction (as indicated by the length a in FIG. 12A) according to the current swing angle (as indicated by the first angle in FIG. 12A) and length of the swingable support rod 902 (as indicated by the length b in FIG. 12A).

The swing distance of the swingable support rod in the horizontal direction is a projection distance in the horizontal direction of a straight-line distance between the current position of the fan head (i.e., the second position) in the case that the swingable support rod swings from a most recently determined history swing angle until current time to reach the current swing angle and the initial position of the fan head when the swingable support rod is in the longitudinal state.

According to the swing distance and the current distance, the axial rotation angle is determined.

In the determining the axial rotation angle that is required to be reached of the fan head 903, as shown in FIG. 12A, it is possible to establish, in a longitudinal plane where the swingable support rod 902 is in, a triangle with the longitudinal straight line where the swingable support rod 902 is located in when it is in the initial state, the straight line where the swingable support rod 902 is located in when it swings and reaches to the current swing angle, and three points on the straight lines, i.e. the position 1 where the fan head 903 is at when the swingable support rod 902 is in the initial state, the position 2 where the fan head 903 is at after swinging of the swingable support rod 902 and the bottom of the swingable support rod 902, and to establish, within the triangle, a right-angle triangle, and thus determines the swing distance a of the swingable support rod 902 in the horizontal direction according to the Pythagorean theorem, and then determine, according to the swing distance a and the current distance (the vertical distance 1 or the hypotenuse thereof), the swing angle of the fan head 903 that is required to be reached in the horizontal direction (i.e. the desired axial rotation angle, shown by the second angle in FIG. 12B). The right-angled triangle shown in FIG. 12B is established according to a swing distance a in the horizontal direction after the swingable support rod swings from its initial state to reach the current swing angle, projection points (i.e. the position 1' and the position 2') of the position 1 and the position 2 where the center of the fan head is located respectively on the ground and the position where the user is located. Further, the plane of the right-angled triangle is perpendicular to a horizontal plane of the swingable support rod. The swing distance a is used as one right-angle side of the right-angle triangle, with its two ends being the position 1' and the position 2', respectively.

In one aspect, the distance acquisition device 905 is mounted on the swingable support rod 902, and includes at least one of the following sensors: an infrared ranging sensor, a position sensor, an infrared image sensor.

The distance acquisition device 905 determines a first current location of the user is determined based on at least one of the sensors; determines a second current location of the fan head; and determines the current distance according to the first location and the second location.

The current distance is determined according to the first location and the second location. In calculation of the current distance, the first position can be used as the starting point of the distance.

According to the first location of the user and the second position of the fan, the current distance between the two positions can be accurately calculated. The current distance may be a vertical distance or straight-line distance between the user and the fan head 903. As shown in FIG. 12B, when the fan head 903 is currently at position 2, the current distance may be the vertical distance 1 or hypotenuse corresponding to the e vertical distance 1.

In one aspect, the current distance may include a straight-line distance between the fan head and the user, or the current distance may include a vertical distance between a longitudinal plane in which the swingable support rod is located and the user.

The current distance may be a vertical distance between a longitudinal plane in which the swingable support rod is located and the user or a straight-line distance between the fan head and the use. As shown in FIG. 12B, when the fan head 903 is at the position 2, the current distance may be the vertical distance 1 or the hypotenuse corresponding to the vertical distance 1.

In one aspect, the fan head control device 907 determines a rotated angle of the fan head, and controls the fan head to rotate according to the axial rotation angle that is currently required to be reached and the rotated angle to blow air for the user.

The swingable support rod 902 continues to swing, so it is not necessarily in its initial state (that is, the rotated angle is not necessarily zero) when axial rotation angle of the fan head is most recently determined. Further, the rotation angle of the fan head 903 varies as change in the current swing angle of the swingable support rod 902. Thus, the fan head 903 has been rotated by a certain angle when its axial rotation angle is most recently determined. Therefore, in order to control the fan head 903 to rotate according to its axial rotation angle, it is possible to control the fan head 903 to rotate according to an axial rotation angle which is required to be reached currently and an axial rotation angle that has been reached (i.e. the rotated angle), by which it is able to adjust rotation angle of the fan head 903 in real time during swinging of the swingable support rod 902 so as to increase air blowing range as much as possible to blow air for the user directly.

In particular, during leftward and rightward swinging of the swingable support rod 902, a desired rotation angle of the fan head 903 relative to the horizontal direction may gradually increase (for example, when the swingable support rod 902 swings from its initial state to its maximum leftward/rightward swing amplitude, the desired rotation angle of the fan head 903 increases gradually), gradually decrease (for example, when the swingable support rod 902 swings back from its maximum leftward/rightward swing amplitude to its initial state, the desired rotation angle of the fan head 903 decreases gradually), gradually decrease and then gradually increase (for example, when the swingable support rod 902 swings from its maximum leftward/rightward swing amplitude to its initial state and then swings from its maximum leftward/rightward swing amplitude to its initial state, the desired rotation angle of the fan head 903 decreases gradually and then increase gradually), so the desired axial rotation angle may be greater than or smaller than the rotated angle. Thus, the fan head control device 907 can control the fan head 903 to rotate by a target angle, wherein the target angle is equal to an absolute value of an angle difference between the desired axial rotation angle and the rotated angle, and direction of the fan head when it is rotated by the target angle is the rotation direction of the motor in the support rod control device (for example, if the motor in the support rod control device rotates rightward (in clockwise), the fan head 903 also rotates rightward by the target angle, while if the motor in the support rod control device rotates leftward (in counterclockwise), the fan head 903 also rotates leftward by the target angle (see from the fan)).

In addition, since there may be a calculation delay from acquisition of the current swing angle of the swingable support rod 902 to calculation of an axis rotation angle that is currently required, for example, a delay of several milliseconds, the target angle can be slightly modified before the fan head 903 is controlled to rotate by the target angle, such that the fan head 903 is controlled to rotate by a modified target angle, which enables the fan head 903 to always rotate, during swing of the swingable support rod, with a most suitable angle as much as possible, in order to ensure the fan head blows air directly to the user as much as possible while the air blowing range can be increased so that the user have most comfortable experiences as much as possible. If the user does not require the fan head to blow air directly to himself, the modification may be ignored.

According to a fourth aspect of the present disclosure, there is provided a device for controlling a fan. The method includes: a processor; a memory for storing instructions executable by the processor, wherein the processor is configured to: acquiring, when a swingable support rod is swinging, a current swing angle of the swingable support rod, wherein swinging of the swingable support rod is controlled by a support rod control device provided between the swingable support rod and the fan base; determining a current distance between the fan and a user who needs air blowing; determining, according to the current distance and the current swing angle, an axial rotation angle of the fan head that is currently required to be reached; and controlling the fan head to rotate according to the axial rotation angle to blow air for the user.

The professor may be further configured such that: the support rod control device may include: a motor having a first gear, wherein the motor is mounted on the fan base, and wherein the swingable support rod has a second gear on its bottom, the second gear being engaged with the first gear; wherein the motor is operable to: drive, upon rotation, the second gear by the first gear to rotate so that the swingable support rod swings, wherein rotation direction of the motor is opposite to swing direction of the swingable support rod, and rotation direction of the axial rotation angle is opposite to the swing direction of the swingable support rod.

The professor may be further configured such that: the acquiring the current swing angle of the swingable support rod may include: acquiring a rotation angle of the motor; and determining the rotation angle of the motor as the current swing angle.

The professor may be further configured such that: the determining, according to the current distance and the current swing angle, the axial rotation angle of the fan head that is currently required to be reached may include: determining, according to the current swing angle and length of the swingable support rod, a swing distance of the swingable support rod in a horizontal direction; and determining, according to the swing distance and the current distance, the axial rotation angle.

The professor may be further configured such that: the swingable support rod may be provided with at least one of the following sensors: an infrared ranging sensor, a position sensor, an infrared image sensor. The determining the current distance between the fan and a user who needs air blowing may include: determining a first current location of the user based on at least one of the sensors; determining a second current location of the fan head currently; and determining the current distance according to the first location and the second location.

The professor may be further configured such that: the current distance may include: a straight-line distance between the fan head and the user. Alternatively, the current distance may include: a vertical-line distance between a longitudinal plane in which the swingable support rod is located and the user.

The professor may be further configured such that: the controlling the fan head to rotate according to the axial rotation angle that is currently required to be reached to blow air for the user may include: determining a rotated angle of the fan head; and controlling the fan head to rotate according to the axial rotation angle that is currently required to be reached and the rotated angle to blow air for the user, wherein the rotated angle is an axial rotation angle of the fan head that is most recently determined.

Figure 13:
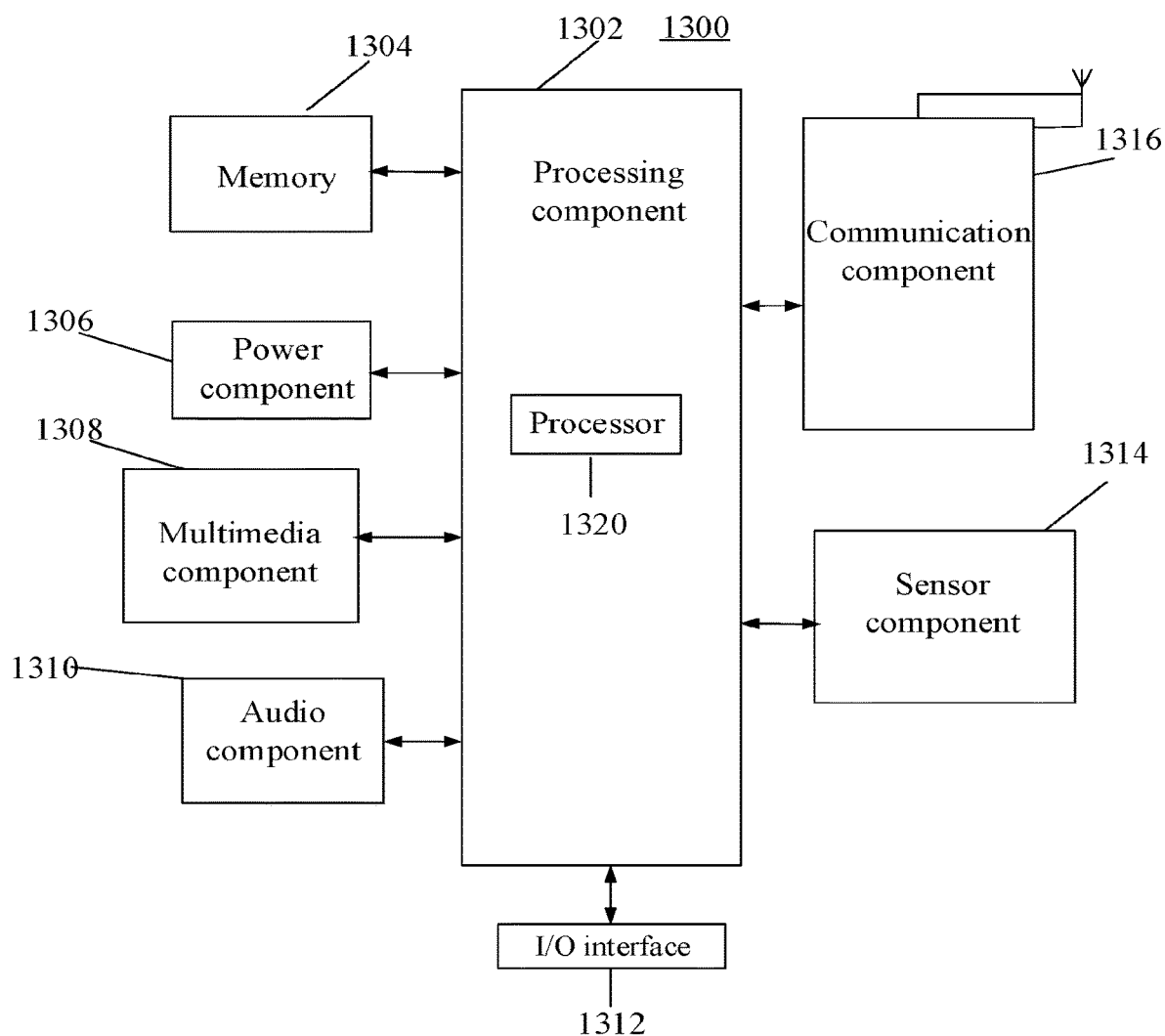
FIG. 13 is a block diagram of a device for controlling a fan in accordance with an exemplary aspect of the present disclosure.

FIG. 13 is a block diagram of a device 1300 for controlling a fan according to an exemplary aspect. The device is applicable to a terminal device. For example, the device 1300 may be a mobile phone, a computer, a digital broadcast terminal, a messaging device, a gaming console, a tablet, a medical device, an exercise equipment, a personal digital assistant, and the like.

As shown in FIG. 13, the device 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the device 1300. Examples of such data include instructions for any storage object or methods operated on the device 1300, contact data, phonebook data, messages, pictures, video, etc. The memory 1304 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the device 1300. The power component 1306 may include a power management system, one or more power sources, and any other components associated with the generation, management, and distribution of power in the device 1300.

The multimedia component 1308 includes a screen providing an output interface between the device 1300 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swiping action, but also sense a period of time and a pressure associated with the touch or swiping action. In some aspects, the multimedia component 1308 includes a front camera and/or a rear camera. The front camera and the rear camera may receive an external multimedia datum while the device 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone ("MIC") configured to receive an external audio signal when the device 1300 is in an operation mode, such as a call mode, a recording mode, and a voice recognition mode. The received audio signal may be further stored in the memory 1304 or transmitted via the communication component 1316. In some aspects, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes one or more sensors to provide status assessments of various aspects of the device 1300. For instance, the sensor component 1314 may detect an open/closed status of the device 1300, relative positioning of components, e.g., the display and the keypad, of the device 1300. The sensor component 1314 may further detect a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a CMOS or CCD image sensor, for use in imaging applications. In some aspects, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the device 1300 and other devices. The device 1300 can access a wireless network based on a communication standard, such as WiFi, 2G; or 3G; or a combination thereof. In one exemplary aspect, the communication component 1316 receives a broadcast signal or broadcast associated information from an external broadcast management system via a broadcast channel. In one exemplary aspect, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the device 1700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary aspects, there is also provided a non-transitory computer-readable storage medium including instructions, such as included in the memory 1304, executable by the processor 1320 in the device 1300, for performing the above-described methods. For example, the non-transitory computer-readable storage medium may be a ROM, a RAM, a CD-ROM, a magnetic tape, a floppy disc, an optical data storage device, and the like.

A non-temporary computer readable storage medium that enables the device 1300 to perform the method for controlling a fan when the instructions in the storage medium are executed by the processor of the device 1300. The method includes: acquiring, when a swingable support rod is swinging, a current swing angle of the swingable support rod, wherein swinging of the swingable support rod is controlled by a support rod control device provided between the swingable support rod and the fan base; determining a current distance between the fan and a user who needs air blowing; determining, according to the current distance and the current swing angle, an axial rotation angle of the fan head that is currently required to be reached; and controlling the fan head to rotate according to the axial rotation angle to blow air for the user.

In one aspect, the support rod control device may include: a motor having a first gear, wherein the motor is mounted on the fan base, and wherein the swingable support rod has a second gear on its bottom, the second gear being engaged with the first gear; wherein the motor is operable to: drive, upon rotation, the second gear by the first gear to rotate so that the swingable support rod swings, wherein rotation direction of the motor is opposite to swing direction of the swingable support rod, and rotation direction of the axial rotation angle is opposite to the swing direction of the swingable support rod.

In one aspect, the acquiring the current swing angle of the swingable support rod may include: acquiring a rotation angle of the motor; and determining the rotation angle of the motor as the current swing angle.

In one aspect, the determining, according to the current distance and the current swing angle, the axial rotation angle of the fan head that is currently required to be reached may include: determining, according to the current swing angle and length of the swingable support rod, a swing distance of the swingable support rod in a horizontal direction; and determining, according to the swing distance and the current distance, the axial rotation angle.

In one aspect, the swingable support rod may be provided with at least one of the following sensors: an infrared ranging sensor, a position sensor, an infrared image sensor. The determining the current distance between the fan and a user who needs air blowing may include: determining a first current location of the user based on at least one of the sensors; determining a second current location of the fan head currently; and determining the current distance according to the first location and the second location.

In one aspect, the current distance may include: a straight-line distance between the fan head and the user. Alternatively, the current distance may include: a vertical-line distance between a longitudinal plane in which the swingable support rod is located and the user.

In one aspect, the controlling the fan head to rotate according to the axial rotation angle that is currently required to be reached to blow air for the user may include: determining a rotated angle of the fan head; and controlling the fan head to rotate according to the axial rotation angle that is currently required to be reached and the rotated angle to blow air for the user, wherein the rotated angle is an axial rotation angle of the fan head that is most recently determined.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for controlling a fan, wherein the fan includes a swingable support rod provided between a fan base and a fan head, the method comprising:
controlling, via a support rod control device, a swinging motion of the swingable support rod with respect to a longitudinal direction, wherein the support rod control device is provided between the swingable support rod and the fan base;
determining, when the swingable support rod is swinging, a current swing angle of the swingable support rod with respect to the longitudinal direction;
determining a current distance between the fan and a user;
determining, based on the current distance and the current swing angle, an axial rotation angle of the fan head with respect to a horizontal direction; and
rotating the fan head based on the axial rotation angle to direct air at the user.

2. The method according to claim 1, wherein the support rod control device comprises:
a motor including a first gear, wherein the motor is mounted on the fan base, and wherein a bottom of the swingable support rod includes a second gear, the second gear being engaged with the first gear;
wherein the motor is configured to drive the second gear by rotating the first gear to swing the swingable support rod, wherein a rotation direction of the motor is opposite to a swing direction of the swingable support rod, and a rotation direction of the axial rotation angle is opposite to the swing direction of the swingable support rod.

3. The method according to claim 2, wherein determining the current swing angle of the swingable support rod comprises:
determining a rotation angle of the motor; and
associating the rotation angle of the motor with the current swing angle.

4. The method according to claim 1, wherein determining the axial rotation angle of the fan head comprises:
determining, based on the current swing angle and a length of the swingable support rod, a swing distance of the swingable support rod in the horizontal direction; and
determining, based on the swing distance and the current distance, the axial rotation angle.

5. The method according to claim 1, wherein the swingable support rod includes a set of sensors including at least one of an infrared ranging sensor, a position sensor, and an infrared image sensor;
wherein determining the current distance between the fan and the user comprises:
determining a first location where the user is located currently based on the set of sensors;
determining a second location where the fan head is located currently; and
determining the current distance based on the first location and the second location.

6. The fan according to claim 5, wherein the support rod control device comprises:
a motor including a first gear, wherein the motor is mounted on the fan base, and wherein a bottom of the swingable support rod includes a second gear, the second gear being engaged with the first gear;
wherein the motor is configured to drive the second gear by rotating the first gear to swing the swingable support rod, wherein a rotation direction of the motor is opposite to a swing direction of the swingable support rod, and a rotation direction of the axial rotation angle is opposite to the swing direction of the swingable support rod.

7. The fan according to claim 6, wherein the support rod control device is configured to:
determine a rotation angle of the motor; and
associate the rotation angle of the motor with the current swing angle.

8. The method according to claim 1, wherein the current distance includes one of a straight-line distance between the fan head and the user, and a vertical-line distance between a longitudinal plane in which the swingable support rod is located and the user.

9. The method according to any one of claim 1, wherein rotating the fan head comprises:
determining a rotated angle of the fan head; and
rotating the fan head based on the axial rotation angle and the rotated angle to direct air at the user, wherein the rotated angle is an axial rotation angle of the fan head that is most recently determined.

10. A device for controlling a fan, wherein the fan includes a swingable support rod provided between a fan base and a fan head, and a support rod control device provided between the swingable support rod and the fan base, the device comprising:
a processor;
a memory for storing instructions executable by the processor;
wherein the processor is configured to:
control, via the support rod control device, a swinging motion of the swingable support rod with respect to a longitudinal direction;
determine, when the swingable support rod is swinging, a current swing angle of the swingable support rod with respect to the longitudinal direction;
determine a current distance between the fan and a user;
determine, based on the current distance and the current swing angle, an axial rotation angle of the fan head with respect to a horizontal direction; and
rotate the fan head based on the axial rotation angle to direct air at the user.

11. The device according to claim 10, wherein the support rod control device comprises:
a motor including a first gear, wherein the motor is mounted on the fan base, and wherein a bottom of the swingable support rod includes a second gear, the second gear being engaged with the first gear;
wherein the motor is configured drive the second gear by rotating the first gear to swing the swingable support rod, wherein a rotation direction of the motor is opposite to a swing direction of the swingable support rod, and a rotation direction of the axial rotation angle is opposite to the swing direction of the swingable support rod.

12. The device according to claim 11, wherein the processor is further configured to:

determine a rotation angle of the motor; and
associate the rotation angle of the motor with the current swing angle.

13. The device according to claim 10, wherein the processor is further configured to:
   determine, based on the current swing angle and a length of the swingable support rod, a swing distance of the swingable support rod in the horizontal direction; and
   determine, based on the swing distance and the current distance, the axial rotation angle.

14. The method according to claim 10, wherein the swingable support rod includes a set of sensors including at least one of an infrared ranging sensor, a position sensor, and an infrared image sensor;
   wherein the processor is further configured to:
   determine a first current location of the user based on the set of sensors;
   determine a second current location of the fan head currently; and
   determine the current distance based on the first location and the second location.

15. The device according to claim 10, wherein the current distance includes one of a straight-line distance between the fan head and the user, and a vertical-line distance between a longitudinal plane in which the swingable support rod is located and the user.

16. The device according to any one of claim 10, wherein the processor is further configured to:
   determine a rotated angle of the fan head;
   rotate the fan head based on the axial rotation angle and the rotated angle to direct air at the user, wherein the rotated angle is an axial rotation angle of the fan head that is most recently determined.

17. A fan, comprising:
   a fan base;
   a fan head;
   a swingable support rod provided between the fan base and the fan head;
   a support rod control device provided between the swingable support rod and the fan base, and configured to control a swinging motion of the swingable support rod with respect to a longitudinal direction, and determine, when the swingable support rod is swinging, a current swing angle of the swingable support rod with respect to the longitudinal direction;
   a distance acquisition device that determines a current distance between the fan and a user;
   a calculation device that determines, based on the current distance and the current swing angle, an axial rotation angle of the fan head with respect to a horizontal direction; and
   a head control device that rotates the fan head based on the axial rotation angle to direct air at the user.

18. The fan according to claim 17, wherein the calculation device is configured to:
   determine, based on the current swing angle and a length of the swingable support rod, a swing distance of the swingable support rod in the horizontal direction; and
   determine, based on the swing distance and the current distance, the axial rotation angle.

19. The fan according to claim 17, wherein the distance acquisition device is mounted on the swingable support rod and includes a set of sensors including at least one of an infrared ranging sensor, a position sensor, and an infrared image sensor;
   wherein the distance acquisition device is configured to:
   determine a first current location of the user based on the set of sensors;
   determine a second current location of the fan head currently; and
   determine the current distance based on according to the first location and the second location.

20. The fan according to any one of claim 17, wherein the head control device is configured to:
   determine a rotated angle of the fan head;
   rotate the fan head based on the axial rotation angle and the rotated angle to direct air at the user, wherein the rotated angle is an axial rotation angle of the fan head that is most recently determined.

* * * * *